(12) United States Patent
Kim et al.

(10) Patent No.: US 11,418,788 B2
(45) Date of Patent: Aug. 16, 2022

(54) METHOD AND APPARATUS FOR PROCESSING VIDEO SIGNAL

(71) Applicant: LG ELECTRONICS INC., Seoul (KR)

(72) Inventors: Yoonjung Kim, Seoul (KR); Jonghun Yoo, Seoul (KR); Dahyun Yoon, Seoul (KR); Nara Lee, Seoul (KR); Sangheon Lee, Seoul (KR); Jaehyeok Lee, Seoul (KR); Taggun Lee, Seoul (KR); Heamin Lee, Seoul (KR); Taeil Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/283,243

(22) PCT Filed: Jan. 21, 2019

(86) PCT No.: PCT/KR2019/000825
§ 371 (c)(1),
(2) Date: Apr. 6, 2021

(87) PCT Pub. No.: WO2020/153506
PCT Pub. Date: Jul. 30, 2020

(65) Prior Publication Data
US 2021/0344921 A1 Nov. 4, 2021

(51) Int. Cl.
*H04N 19/124* (2014.01)
*H04N 19/18* (2014.01)
(Continued)

(52) U.S. Cl.
CPC .......... *H04N 19/124* (2014.11); *H04N 19/18* (2014.11); *H04N 19/63* (2014.11); *H04N 19/91* (2014.11)

(58) Field of Classification Search
CPC ...... H04N 19/124; H04N 19/18; H04N 19/63; H04N 19/91; H04N 19/136; H04N 19/70; H04N 19/132; H04N 19/184
See application file for complete search history.

(56) References Cited

U.S. PATENT DOCUMENTS

| 6,574,372 B2 * | 6/2003 | Ratnakar ................. G06T 9/007 |
| | | 382/233 |
| 2010/0046628 A1 * | 2/2010 | Bhaskaran ........... H04N 19/103 |
| | | 375/240.24 |

(Continued)

FOREIGN PATENT DOCUMENTS

| KR | 101166732 | 7/2012 |
| WO | 2018041379 | 3/2018 |

(Continued)

OTHER PUBLICATIONS

PCT International Application No. PCT/KR2019/000825, International Search Report dated Oct. 18, 2019, 11 pages.

*Primary Examiner* — Joseph Suh
(74) *Attorney, Agent, or Firm* — Lee Hong Degerman Kang & Waimey

(57) ABSTRACT

A method for encoding a video signal that includes determining a bit budget for a current precinct, determining a quantization parameter for the current precinct based on the determined bit budget, and determining a bit budget for sign information of the wavelet coefficient information based on that the number of significant bits of the wavelet coefficient information is greater than a truncation position. The method also includes performing quantization on the wavelet coefficient information based on that the significant bit number of the wavelet coefficient information is equal to the truncation position, such that the quantization is skipped based (Continued)

on that the significant bit number of the wavelet coefficient information is greater than the truncation position.

12 Claims, 14 Drawing Sheets

(51) Int. Cl.
*H04N 19/63* (2014.01)
*H04N 19/91* (2014.01)

(56) References Cited

U.S. PATENT DOCUMENTS

2018/0192051 A1\* 7/2018 Dessy .................... H04N 19/12
2020/0092554 A1\* 3/2020 Sarwer ................... H04N 19/12

FOREIGN PATENT DOCUMENTS

| WO | 2018165695 | 9/2018 | |
|----|---|---|---|
| WO | WO-2018165695 A1 \* | 9/2018 | ............. H04N 19/64 |
| WO | 2019011484 | 1/2019 | |
| WO | WO-2019006488 A1 \* | 1/2019 | ........... H04N 19/174 |

\* cited by examiner (a)

(b)

○ Luma sample    × Chroma sample

Mx: Significant bit number of wavelet coefficient information of code group
T: Truncation position (e.g., 0 ~ 15) of code group
v: Quantization index magnitude

* Mx > T: Bit budget of sign information = 1 (no quantization)
* Mx = T: Bit budget of sign information = 0 or 1 (depending on quantization result)
* Mx < T: Bit budget of sign information = 0 (no quantization)of sign information = 1 (no quantization)

Mx: Significant bit number of wavelet coefficient information
T: Truncation position (e.g., 0 ~ 15)

METHOD AND APPARATUS FOR PROCESSING VIDEO SIGNAL

CROSS-REFERENCE TO RELATED APPLICATIONS

This application is the National Stage filing under 35 U.S.C. 371 of International Application No. PCT/KR2019/000825, filed on Jan. 21, 2019, the contents of which are all hereby incorporated by reference herein in their entirety.

TECHNICAL FIELD

The present disclosure relates to a video signal processing method and apparatus, and more particularly, to a method of determining a bit budget efficiently for a bit rate control and apparatus therefor.

BACKGROUND ART

As the services based on high-definition multimedia content such as digital multimedia and Internet broadcasting are activated, high-compression and high-speed video processing technologies for high-resolution video signals are required.

Specifically, since video contents supportive of High Dynamic Range (HDR) higher than 10 bits per sample, higher frame rates such as 120 Frames Per Second (FPS) or 60 FPS, and 8K UHD resolutions 8K UHD resolution (e.g. 7680×4320 or 8192×4320) beyond 4K UHD (e.g., 3840× 2160 or 4096×2160) video content) are increased, data sizes are increasing rapidly. In addition, there is a growing number of services and applications for transmitting and receiving such video contents via wireless communication systems (e.g., 3GPP Long Term Evolution (LTE), LTE-Advanced (LTE-A), LTE-A Pro, 5G or New Radio (NR), WiFi (IEEE 802.11) or Wired communication systems (e.g., Ethernet (IEEE 802.3)). As a result, discussions on video compression standards such as Versatile Video Coding (VVC), H.265/High Efficiency Video Coding (HEVC), and H.246/Advanced Video Coding (AVC) are actively underway.

However, since video compression standards such as VVC, HEVC, and AVC are not designed for video coding of low latency and low complexity but for high compression, discussions on Joint Photographic Experts Group-Extra Speed and Extra Small (JPEG-XS) (ISO/IEC 21122) standard capable of visually lossless compression while providing a video coding function of low latency and low complexity are recently in progress. The JPEG-XS standard is an optimized video compression technology for video real-time streaming over wireless (e.g., 5G, NR, WiFi systems) or wired (e.g., Ethernet), and discussions on methods and apparatuses for efficiently coding video signals based on the JPEG-XS standard are actively underway.

DETAILED DESCRIPTION OF DISCLOSURE

Technical Tasks

One technical task of the present disclosure is to provide a method and apparatus for improving encoding performance of a video signal.

Another technical task of the present disclosure is to provide a method and apparatus for improving encoding performance of a video signal by reducing an operation quantity required for bit budget estimation for a bitrate control.

Further technical task of the present disclosure is to provide a hardware configuration efficiently by reducing the number of quantization units (i.e., quantizers) required for a bitrate control.

Technical tasks obtainable from the present disclosure are non-limited the above-mentioned technical task. Additionally, other unmentioned technical tasks can be clearly understood from the following description by those having ordinary skill in the technical field to which the present disclosure pertains.

Technical Solutions

In a first technical aspect of the present disclosure, provided is a method of encoding a video signal in an encoding device, the method including determining a bit budget for a current precinct and determining a quantization parameter for the current precinct based on the determined bit budget, wherein the current precinct includes wavelet coefficient information, wherein the wavelet coefficient information is grouped into a code group, wherein the determining the bit budget for the current precinct includes determining a bit budget for sign information of the wavelet coefficient information based on that the number of significant bits of the wavelet coefficient information is greater than a truncation position, determining the bit budget for the sign information of the wavelet coefficient information as 0 based on that the significant bit number of the wavelet coefficient information is smaller than the truncation position, performing quantization on the wavelet coefficient information based on that the significant bit number of the wavelet coefficient information is equal to the truncation position, determining the bit budget for the sign information of the wavelet coefficient information as 0 based on that a result of the quantization is 0, and determining the bit budget for the sign information of the wavelet coefficient information as 1 based on that a result of the quantization is not 0.

In a second technical aspect of the present disclosure, provided is an apparatus for encoding a video signal, the apparatus including a memory storing wavelet coefficient information configuring a current precinct and a bitrate controller configured to determine a bit budget for the current precinct and determine a quantization parameter for the current precinct based on the determined bit budget, wherein the wavelet coefficient information is grouped into a code group and wherein the bitrate controller is further configured to determine a bit budget for sign information of the wavelet coefficient information based on that the number of significant bits of the wavelet coefficient information is greater than a truncation position, determine the bit budget for the sign information of the wavelet coefficient information as 0 based on that the significant bit number of the wavelet coefficient information is smaller than the truncation position, perform quantization on the wavelet coefficient information based on that the significant bit number of the wavelet coefficient information is equal to the truncation position, determine the bit budget for the sign information of the wavelet coefficient information as 0 based on that a result of the quantization is 0, and determine the bit budget for the sign information of the wavelet coefficient information as 1 based on that a result of the quantization is not 0.

Preferably, the quantization may be skipped based on that the significant bit number of the wavelet coefficient information is greater than the truncation position.

Preferably, 3. the quantization may be skipped based on that the significant bit number of the wavelet coefficient information is smaller than the truncation position.

Preferably, the quantization may include uniform quantization based on the truncation position and a bitplane count of the code group.

Preferably, the uniform quantization may be performed based on a following equation:

$$v=((d<<\zeta)-d+(1<<M))>>(M+1), \zeta=M-T+1$$

the v may indicate the result of the quantization, the d may indicate an absolute value of the wavelet coefficient information, the M may indicate the bitplane count of the code group, and the T may indicate the truncation position.

Preferably, the bitplane count may indicate the number of bitplanes ranging from a least significant bitplane to a non-zero most significant bitplane among bitplanes of the code group and the bitplane may indicate arrangement of bits located at the same significance in the wavelet coefficient information of the code group.

Preferably, the truncation position may indicate the number of least significant bitplanes to be received from each wavelet coefficient information of the code group by the quantization.

Preferably, the code group may include four consecutive wavelet coefficient informations in the current precinct.

Preferably, the significant bit number of the wavelet coefficient information may indicate the bit number ranging from a least significant bit to a non-zero most significant bit in an absolute value of the wavelet coefficient information.

Preferably, the method may further include obtaining quantization index information by performing the quantization on the wavelet coefficient information based on the determined quantization parameter.

Preferably, the method may further include performing entropy encoding based on the quantization index information, and the performing the entropy encoding may include encoding one bit indicating sign information of the wavelet coefficient information to a sign subpacket based on that the quantization index magnitude information is not 0 and skipping encoding for the sign information of the wavelet coefficient information based on that the quantization index magnitude information is 0.

Preferably, the method may further include generating a bitstream for the video signal based on the sign subpacket.

Advantageous Effects

According to the present disclosure, encoding performance of a video signal can be enhanced.

According to the present disclosure, an operation quantity required for bit budget estimation for a bitrate control is reduced, thereby enhancing encoding performance of a video signal.

According to the present disclosure, the number of quantizers required for a bitrate control is reduced, whereby hardware can be efficiently configured.

Effects obtainable from the present disclosure are non-limited the above-mentioned technical effect. Additionally, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

The following description is usable for a video signal processing device configured to encode a video signal. Although a video signal refers to a sequence of images or pictures recognizable by eyes in general, a video signal in the present specification may be usable to indicate a sequence of bits that indicates a coded picture. In addition, in the present specification, a sequence of bits indicating a coded picture may be referred to as a bitstream for a video signal, and more schematically, as a bitstream or a video signal. A bitstream may be used with a codestream, and encoding may be used with coding.

A picture may refer to arrangement of samples and be used with such a term as a frame, an image, etc. Particularly, a picture may refer to a 2-dimensional arrangement of samples or a 2-dimensional sample arrangement. In the present specification, a picture and an image may be used together. A sample may refer to a minimum unit that configures a picture, and be referred to as a pixel, a picture element, a pel, etc. A picture may include a luminance component and/or a color difference component. In the present specification, a luminance component may be used with a luma component, a luma signal, a luma, etc., and a color difference component may be used with a chrominance component, a chroma component, a chrominance signal, a chroma signal, a chroma, etc.

In the present specification, a hexadecimal number expresses a value in a manner of attaching a prefix of '0x' thereto for the distinction from a decimal number. For example, 0xFF indicates 1-byte hexadecimal number having a value of FF.

Although the present disclosure is described based on the JPEG-XS standard, the principle of the present disclosure is non-limited by the JPEG-XS standard but is applicable to other video compression technologies identical/similar to the JPEG-XS standard.

Figure 1:
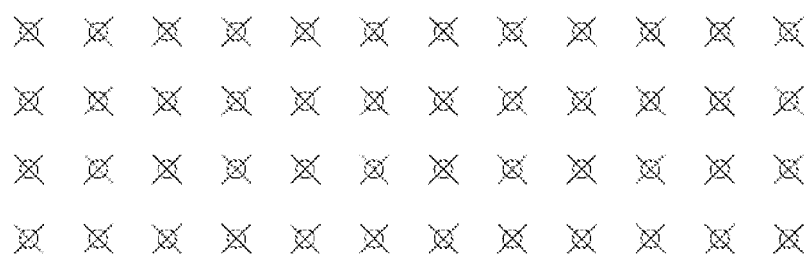
FIG. 1 illustrates a chroma subsampling format.
Figure 1:
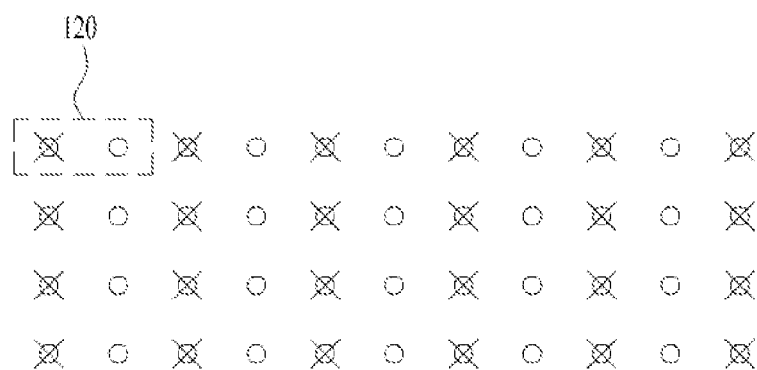

FIG. 1 illustrates a chroma subsampling format. FIG. 1 (a) illustrates a 444 format and FIG. 1 (b) illustrates a 422 format.

A picture may have RGB color format and YCbCr color format. A picture having RGB color format includes Red (R) component, Green (G) component, and Blue (B) component, and may be transformed into YCbCr color format for encoding/decoding. A picture having YCbCr color format includes a luma component and two chroma components (Cb, Cr). A transform method between RGB format and YCbCr color format are widely known to the image processing technical field, and its specific description will be omitted from the present specification.

Each component (luma component, chroma component) of a picture having YCbCr color format may be represented as a 2-dimensional arrangement of samples aligned along a rectangular sampling grid. Although the chroma component may have the same dimension of the luma component, as human eyes are less sensitive to the luma component than the chroma component, samples of the chroma component may be represented by subsampling to reduce an information size of a chroma signal.

Referring to FIG. 1 (a), a luma sample and a chroma sample may be sampled on the same sampling grind. In this case, a luma component and a chroma component of a picture may have the same dimension. Such a chroma subsampling format is referred to as a 444 chroma subsampling format or a 444 format, or may be referred to as a 4:4:4 chroma subsampling format or a 4:4:4 format.

Referring to FIG. 1 (b), although luma samples are sampled exactly as shown in FIG. 1 (a), 2:1 subsampling is applicable in a horizontal direction to samples of a chroma component. For example, luma samples are sampled on two sample grids 120, but chroma samples may be sampled on a left one of the two sample grids 120 only. Such a chroma subsampling format is referred to as a 422 chroma subsampling format or a 422 format, or may be referred to as a 4:2:2 chroma subsampling format or a 4:2:2 format. In case that the 422 format is applied, a horizontal dimension of a chroma component of a picture is a half of a horizontal dimension of a luma component, but a vertical dimension of the chroma component is equal to that of the luma component.

Figure 2:
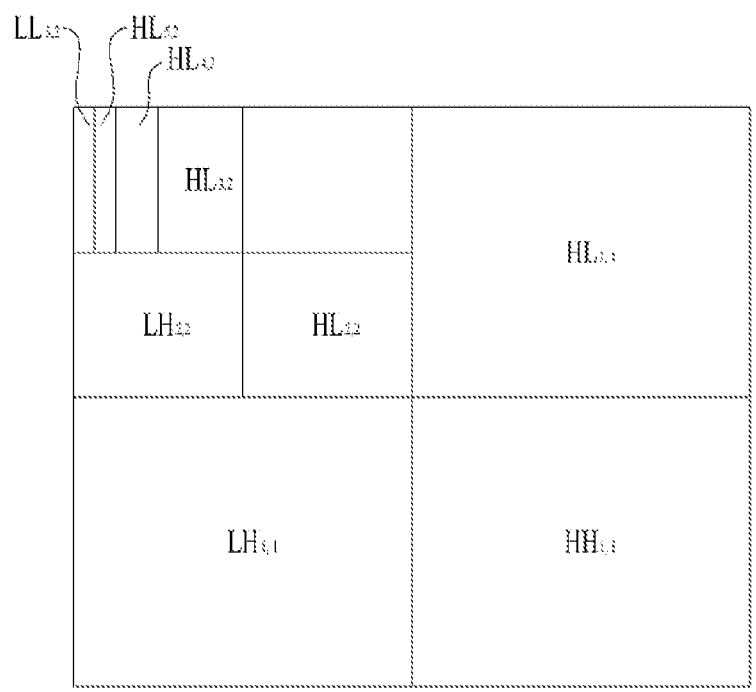
FIG. 2 illustrates a band generated by applying a wavelet transform.

FIG. 2 illustrates a band generated by applying a wavelet transform.

In the JPEG-XS standard, Discrete Wavelet Transformation (DWT) is used for encoding and Inverse DWT is used for decoding. The DWT refers to a process for decomposing an image into at least one high frequency band and at least one low frequency band by applying a highpass filter to samples of an image in a horizontal direction and/or a vertical direction, and may be referred to as a wavelet transformation or a transformation schematically in the present specification. A highpass filter applied for wavelet transformation may be referred to as a wavelet filter. A result from being generated by performing wavelet transformation on samples configuring an image in space domain is referred to as wavelet coefficient information, and may be used with such a term as transformation coefficient information, wavelet coefficient, transformation coefficient, etc. in the present specification.

The inverse DWT refers to a process for reconstructing image samples or composing into a single band by interleaving at least one high frequency band and at least one low frequency band and then applying a wavelet filter thereto, and may be referred to as an inverse wavelet transformation or an inverse transformation schematically in the present specification.

In the JPEG-XS standard, an image can be horizontally decomposed into two to six bands by applying1 wavelet transformation one to six times in a horizontal direction, and an image can be vertically decomposed into 1 to 3 bands by applying wavelet transformation 0 to two times in a vertical direction. The count of decomposing an image into bands by applying a wavelet filter in a horizontal or vertical direction is referred to as a decomposition level or a decomposition depth.

Referring to FIG. 2, a result from performing level-5 horizontal decomposition and level-2 vertical decomposition on an image through wavelet transformation is illustrated. In the example of FIG. 2, 'H' refers to a high frequency band generated by applying a wavelet filter, refers to a low frequency band generated by excluding a high frequency band, and a subscript refers to a decomposition level. A front character indicates a horizontal direction and a rear character indicates a vertical direction.

For example, in an encoder, an original image is decomposed into $LH_{0,1}$ band and $LL_{0,1}$ band by applying vertical wavelet transformation to the original image, the $LL_{0,1}$ band is decomposed into $LL_{1,1}$ band and $HL_{1,1}$ band by applying horizontal wavelet transformation to the $LL_{0,1}$ band, and the $LH_{0,1}$ band may be then decomposed into Ulu band and $HH_{1,1}$ band by applying horizontal wavelet transformation to the $LH_{0,1}$ band. Likewise, the $LL_{1,1}$ band is decomposed into $LH_{1,2}$ band and $LL_{1,2}$ band by applying vertical wavelet transformation to the $LL_{1,1}$ band, the $LL_{1,2}$ band is decomposed into $LL_{2,2}$ band and $HL_{2,2}$ band by applying horizontal wavelet transformation to the $LL_{1,2}$ band, and the $LH_{1,2}$ band may be then decomposed into $LH_{2,2}$ band and $HH_{2,2}$ band by applying horizontal wavelet transformation to the $LH_{1,2}$ band. The $LL_{2,2}$ band may be decomposed into $HL_{3,2}$ band and $LL_{3,2}$ band by applying horizontal wavelet transformation thereto. Likewise, the $LL_{3,2}$ band may be decomposed into $HL_{4,2}$ band and $LL_{4,2}$ band by applying horizontal wavelet transformation thereto, and the $LL_{4,2}$ band may be decomposed into $HL_{5,2}$ band and $LL_{5,2}$ band by applying horizontal wavelet transformation thereto.

In a decoder, samples of a space domain can be reconstructed from wavelet coefficients of a frequency domain by composing bands in order inverse to that of the above-described process.

As shown in the example of FIG. 2, a dimension of a band generated by applying wavelet transformation may become a half of a dimension of an original image or a previous band. Hence, dimensions of full bands formed in a manner of connecting each band in frequency domain, i.e., the number of wavelet coefficients configuring widths and heights of the full bands, may be equal to a dimension of an image in space domain, i.e., the number of samples configuring a width and height of the image.

In addition, a single row of a wavelet coefficient on $LL_{5,2}$ band, $HL_{5,2}$ band, $HL_{4,2}$ band, $HL_{3,2}$ band, $HL_{2,2}$ band, $LH_{2,2}$ band, and $HH_{2,2}$ band may correspond to four rows of samples in space domain, and two rows of a wavelet coefficient on $HL_{1,1}$ band, $LH_{1,1}$ band, and $HH_{1,1}$ band may correspond to two rows of samples in space domain. Namely, one row of a wavelet coefficient on $LL_{5,2}$ band, $HL_{5,2}$ band, $HL_{4,2}$ band, $HL_{3,2}$ band, $HL_{2,2}$ band, $LH_{2,2}$ band, and $HH_{2,2}$ band and two rows of a wavelet coefficient on $HL_{1,1}$ band, $LH_{1,1}$ band, and $HH_{1,1}$ band may contribute to reconstructing the same spatial region. A spatial region refers to a region of samples having a specific dimension in space domain.

Figure 3:
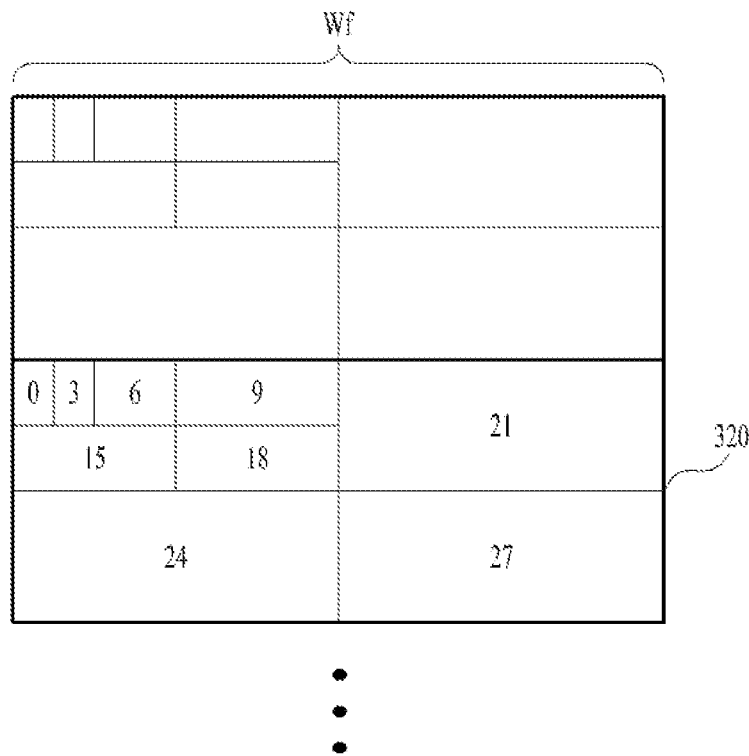
FIG. 3 illustrates a precinct.
Figure 3:
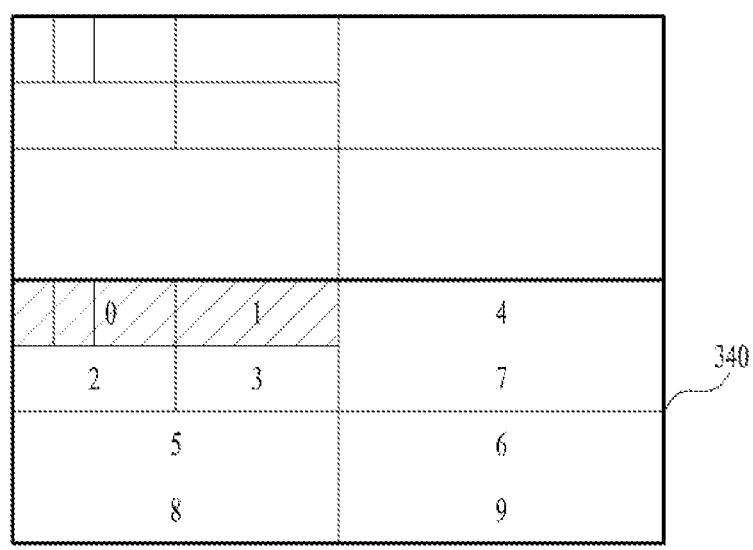

FIG. 3 illustrates a precinct.

As described above, wavelet coefficient information generated through wavelet transformation may be grouped in precinct unit in frequency domain. Precinct refers to collection of wavelet coefficients of all bands contributing to (reconstruction of) a specific spatial region of an image. A width of precinct may be set equal to that of an image or set to a multiple of 8. Information indicating a width of precinct may be included in a picture header (see FIG. 6 for example) of a bitstream, and a decoder may identify the width of the precinct by parsing the picture header.

Referring to FIG. 3, a thick line indicates a boundary of a precinct and a thin line indicates a boundary of a ban configuring the precinct. A width of the precinct is assumed as configured equal to a width Wf of an image in the example of FIG. 3, by which the present disclosure is non-limited.

Firstly, for clarity of description, a band index is defined. A wavelet filter type β may be assigned to each band, and an index of each band may be given based on the wavelet filter type β. For example, Table 1 illustrates a value of a wavelet filter type for each band shown in FIG. 2, and an index of each band may be given based on Equation 1.

TABLE 1

| Wavelet filter type β | Wavelet filtering and decomposition depths |
| --- | --- |
| 0 | $LL_{5,2}$ |
| 1 | $HL_{5,2}$ |
| 2 | $HL_{4,2}$ |
| 3 | $HL_{3,2}$ |
| 4 | $HL_{2,2}$ |
| 5 | $LH_{2,2}$ |
| 6 | $HH_{2,2}$ |
| 7 | $HL_{1,1}$ |
| 8 | $LH_{1,1}$ |
| 9 | $HH_{1,1}$ |

$$b = N_c \times \beta + i \quad \text{[Equation 1]}$$

In Equation 1, b indicates a band index, Nc indicates the number of components of an image, and I indicates a component index. For example, if an image has YCbCr format, Nc may be 3, an index of a Y component may be 0, an index of a Cb component may be 1, and an index of a Cr component may be 2. Hence, a band for the Y component may have an index of 0, 3, 6, 9, 12, 15, 18, 21, 24, or 27, a band for the Cb component may have an index of 1, 4, 7, 10, 13, 16, 19, 22, 25, or 28, and a bad for the Cr component may have an index of 2, 5, 8, 11, 14, 17, 20, 23, 26, or 29.

As described above, since one tow of the transformation coefficient in $LL_{5,2}$ band, $HL_{5,2}$ band, $HL_{4,2}$ band, $HL_{3,2}$ band, $HL_{2,2}$ band, $LH_{2,2}$ band, and $HH_{2,2}$ band and two rows of the transformation coefficient in $HL_{1,1}$ band, $LH_{1,1}$ band, and $HH_{1,1}$ band can contribute to the reconstruction of the same spatial region, one precinct 320 in the example of FIG. 3 may include one row of the wavelet coefficient from each of bands 0, 3, 6, 8, 12, 15, and 18 and two rows of the wavelet coefficient from each of bands 21, 24, and 27.

Wavelet coefficients of each precinct may be entropy-encoded in packet unit through quantization. Particularly, data entropy-encoded from the precinct may be grouped into one or more packets per band and line of the precinct. For example, Table 2 illustrates the relationship between a packet and a line and band.

TABLE 2

| Packet index | Line number | Included bands |
| --- | --- | --- |
| 0 | 0 | (0, 1, 2) (3, 4, 5) (6, 7, 8) (9, 10, 11) |
| 1 | 0 | (12, 13, 14) |
| 2 | 1 | (15, 16, 17) |
| 3 | 1 | (18, 19, 20) |
| 4 | 0 | (21, 22, 23) |

TABLE 2-continued

| Packet index | Line number | Included bands |
| --- | --- | --- |
| 5 | 2 | (24, 25, 26) |
| 6 | 2 | (27, 28, 29) |
| 7 | 1 | (21, 22, 23) |
| 8 | 3 | (24, 25, 26) |
| 9 | 3 | (27, 28, 29) |

Referring to FIG. 3 based on Table 2, (entropy-encoded) data for one precinct 340 is included in 10 packets, i.e., packets 0 to 9. Particularly, (entropy-encoded) data for bands 0, 3, 6 and 9 (see the shaded part) configuring the one precinct 340 is included in one packet (packet 0). In addition, (entropy-encoded) data for band 12 is included in one packet, i.e., packet 1, and (entropy-encoded) data for band 15 is included in one packet, i.e., packet 2, and (entropy-encoded) data for band 18 is included in one packet, i.e., packet 3. In addition, (entropy-encoded) data for band 21 is included in two packets per line, i.e., packet 4 and packet 7, (entropy-encoded) data for band 24 is included in two packets per line, i.e., packet 5 and packet 8, and (entropy-encoded) data for band 27 may be included in two packets per line, i.e., packet 6 and packet 9.

In addition, based on Table 2, (entropy-encoded) data for a chroma component band may be included in a corresponding packet.

Figure 4:
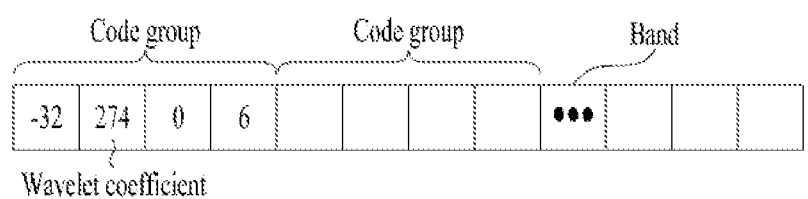
FIG. 4 illustrates a code group.

FIG. 4 illustrates a code group.

A plurality of consecutive wavelet coefficients in one line of a precinct may be grouped and then quantized and entropy-coded in group unit. Such a group of the wavelet coefficients is referred to as a code group. Quantized wavelet coefficients can be generated by performing quantization on the respective wavelet coefficients of a code group. The quantized wavelet coefficients are referred to as quantization indexes, and may be referred to as quantization index information, quantized wavelet coefficient information, quantized transformation coefficient information, etc. A group of quantization indexes to which quantization is applied may be referred to as a code group. As a non-limited example, a single code group may include information of four wavelet coefficients or quantization indexes.

For example, referring to FIG. 4, wavelet coefficients included in a single line of a specific band are illustrated. A code group may be formed by grouping a plurality of (e.g., 4) consecutive wavelet coefficients from the first of the line. Particularly, in the example of FIG. 4, a single line included in a specific band may include wavelet coefficients −32, 274, 0, 6 . . . consecutively located from the first, and quantization and entropy encoding may be performed by grouping the four wavelet coefficients into a single group.

Figure 5:
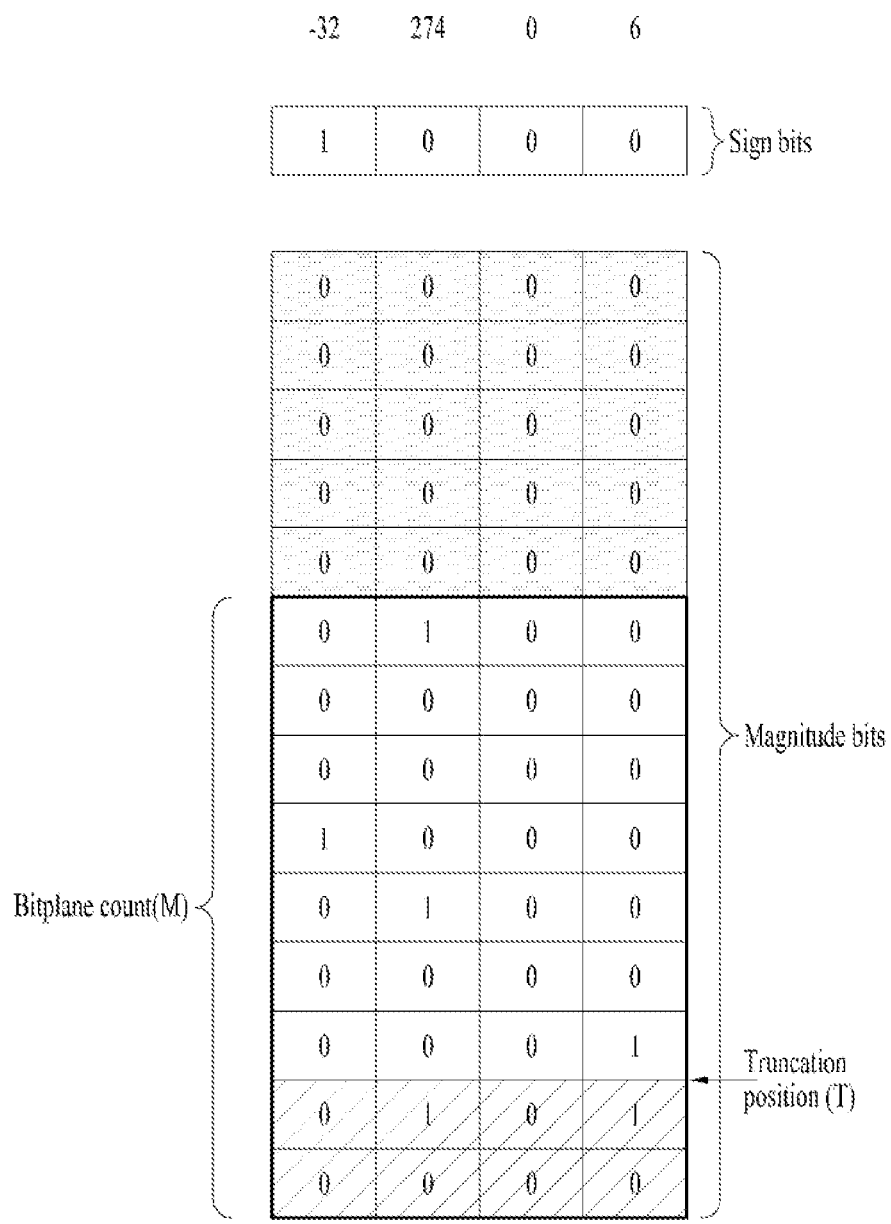
FIG. 5 illustrates a bitplane.

FIG. 5 illustrates a bitplane.

Wavelet coefficient information may be represented as sign information and magnitude information. Sign information indicates a sign of wavelet coefficient information. As a non-limited example, if sign information has a value of 1, it may indicate a negative sign. If sign information has a value of 0, it may indicate a positive sign. Magnitude information indicates an absolute value of a wavelet coefficient.

Arrangement of bits located at the same bit position in a code group is referred to as a bitplane. Information indicating the number of bitplanes from a least significant bitplane to a most significant bitplane that is non-zero is referred to as bitplane count information (named 'M information' for clarity), and may be schematically referred to as a bitplane count.

Referring to FIG. 5, a bitplane for wavelet coefficients included in a code group shown in FIG. 4 is illustrated. In the example of FIG. 5, it is assumed that magnitude information of a wavelet coefficient is represented as 16 bits, that sign information of a wavelet coefficient is represented as 1 bit, and that two least significant bits are removed by quantization. Such assumptions are exemplary only, by which the present disclosure is non-limited. As a single code group includes four wavelet coefficients −32, 274, 0 and 6, bitplanes 11 to 15 are all zero, and a non-zero most significant bitplane is located at a ninth bit position (i.e., a bitplane 8). Hence, in the example of FIG. 5, a value of M information may be set to 9.

In addition, information indicating the number of least significant bitplanes received from a wavelet coefficient by quantization is referred to as truncation position information (referred to as 'T information' for clarity). For example, T information may be set to one of 0 to 15. In the example of FIG. 5, as two least significant bits are assumed as removed by quantization, bit 0 and bit 1 can be removed and a value of T information may be set to 2. T information may be encoded based on band priority information (referred to as P information for clarity) transmitted through a weight table (see FIG. 6 for example), precinct quantization information (referred to as Q information for clarity) transmitted through a precinct header (see FIG. 6 for example), and precinct refinement threshold information (referred to as R information for clarity).

A plurality of consecutive code groups may be grouped into a single significance group. Information indicating whether a significance group includes a non-zero code group may be signaled for a bitstream for each significance group, and this information is referred to as significance flag information (referred to as Z information for clarity). For example, if Z information has a value of 0, a corresponding significance group may include at least one non-zero code group. If Z information has a value of 1, it indicates that all code groups in a corresponding significance group are zero. As a non-limited example, a single significance group may include eight code groups.

Like a wavelet coefficient, a quantization index may be represented as sign information and magnitude information. Sign information is set equal to sign information of a wavelet coefficient. As a non-limited example, if sign information has a value of 1, it may indicate a negative sign. If sign information has a value of 0, it may indicate a positive sign. Magnitude information may indicate an absolute value of a quantized wavelet coefficient, be represented as maximum 16 bits, and be referred to as quantization index magnitude information or quantization index magnitude.

In the JPEG-XS standard, two types of quantization such as deadzone quantization and uniform quantization are supported. To this end, information (referred to as Qpih information for clarity) indicating a used quantization type (for encoding) (e.g., deadzone quantization or uniform quantization) may be included in a picture header (see FIG. 6 for example). For example, deadzone quantization may be implemented in a manner of representing a wavelet coefficient as sign information and magnitude information and shifting the magnitude information to the right by a value of T information. For example, deadzone quantization may be performed based on Equation 2. In Equation 2, v indicates a quantization index magnitude, d indicates wavelet coefficient magnitude information, and T indicates truncation position information.

$$V = d >> T \qquad \text{[Equation 2]}$$

Uniform quantization may be implemented in a manner of dividing magnitude information of a wavelet coefficient by taking a quantization step size as $$\Delta = \frac{2^{M+1}}{2^{M+1-T} - 1}$$

and then rounding off it. For example, uniform quantization may be performed based on Equation 3. In Equation 3, v indicates a quantization index magnitude, d indicates wavelet coefficient magnitude information, M indicates bitplane count information, and T indicates truncation position information.

$$v = ((d << \zeta) - d + (1 << M)) >> (M+1), \zeta = M - T + 1 \qquad \text{[Equation 3]}$$

Quantization index magnitude information and sign information generated through quantization may be added to a bitstream through entropy encoding.

Figure 6:
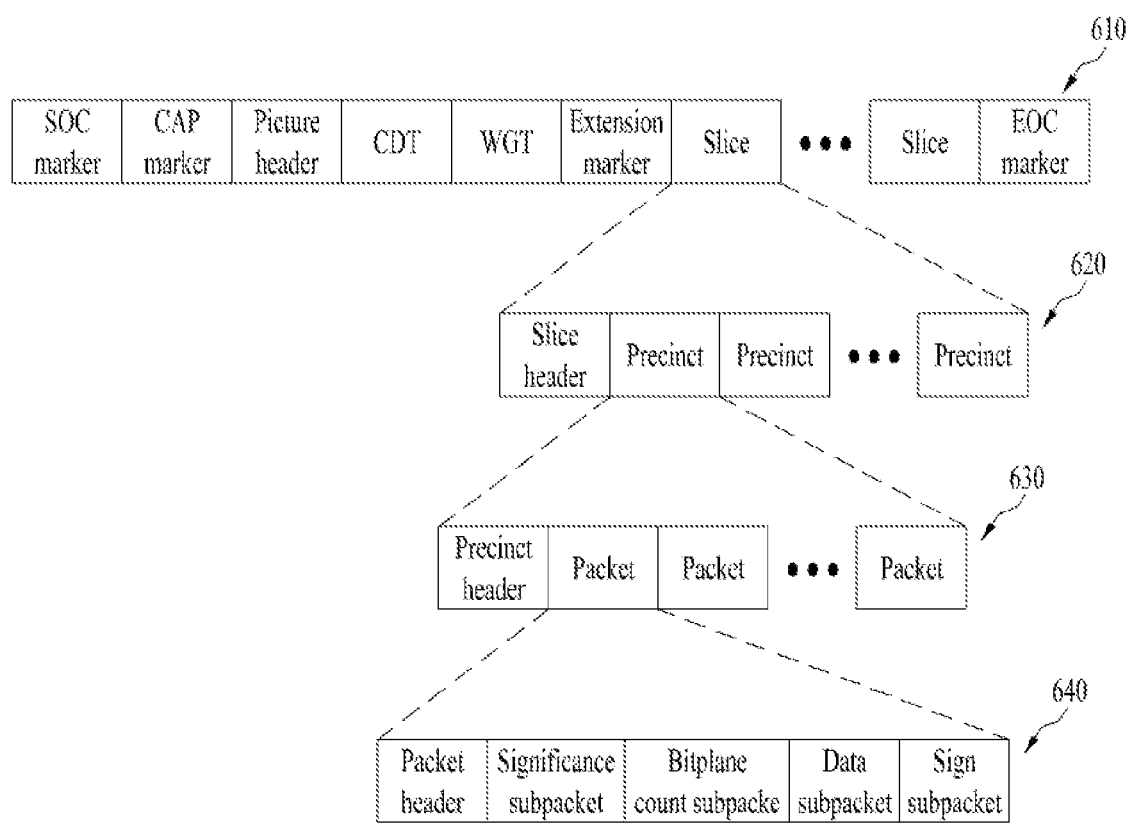
FIG. 6 illustrates a bitstream according to JPEG-XS standard.

FIG. 6 illustrates a bitstream according to JPEG-XS standard.

A bitstream generated from encoding a single image according to the JPEG-XS standard may include syntax informations 610, 620, 630 and 640 illustrated in FIG. 6. As a video signal may include a plurality of images, if each image is encoded according to the JPEG-XS standard, a bitstream may be generated in a manner that the bitstream illustrated in FIG. 6 is concatenated. The syntax informations classified by lines in FIG. 6 may be aligned in byte unit. Hence, in case that the corresponding syntax information is not aligned in byte unit in performing encoding, a padding bit or a filter bit may be added for the byte alignment. For example, '0' may be added to the last of the corresponding syntax information as a padding or filter bit.

An SOC (start of codestream) marker is syntax information for identifying that a bitstream is a bitstream according to the JPEG-XS standard, and means a start of a bitstream for a single picture. For example, an SOC marker may have a length of 2 bytes and a value of 0xFF10. An EOC marker is information for identifying an end of a bitstream, and means an end of a bitstream for a single picture. For example, an EOC marker may have a length of 2 bytes and a value of 0xFF11. In a decoder, it is able to identify a start and end of a bitstream for a single picture based on an SOC marker and an EOC marker.

A capabilities marker (or a CAP marker) is information for identifying capability required for decoding a bitstream according to JPEG-XS. In the current standard, capability is not defined and a capability marker may include a value of 0xFF50 of 2 bytes.

A picture header includes information on a dimension of an image, information on a component of the image, and information for configuration of a decoder. Particularly, a picture header may include a marker (e.g., 0xFF12 of 2-byte length) for identifying a picture, information indicating a width (by the number of samples) of the image, information indicating a height (by the number of samples) of the image, information indicating the number of components in the image, etc. In addition, the picture header may include information indicating a width of a precinct, information indicating a quantization type (or Qpih information), information (referred to as Fs information for clarity) indicating whether sign information is encoded together with a data subpacket or encoded as a separate sign subpacket, information (referred to as Cpih information for clarity) indicating whether to perform inverse multi-component transformation, and information (referred to as Br information for clarity) indicating the number of bits for bitplane count information (or M information).

A component table (or CDT) includes specific information on components configuring an image. Particularly, a component table may include a marker (e.g., 0xFF13) for identifying a start of the component table, information indicating bit precision of each component, information (referred to as Sx for clarity) indicating a horizontal subsampling factor of each component, information (referred to as Sy for clarity) indicating a vertical subsampling factor of each component, etc. The bit precision refers to the number of bits required for indicating a single sample. As an example non-limiting the present disclosure, when Sx and Sy have a value of 1 each, it indicates 1:1 subsampling. When Sx and Sy have a value of 2 each, it indicates 2:1 subsampling. Hence, in case of a 444 format (see FIG. 1 (a) for example), Sx and Sy may have a value of 1 for all components. In case of a 422 format (see FIG. 1 (b) for example), although Sy may have a value of 1 for all components, Sx has a value of 1 for a luma component and a value or 2 for a chroma component.

A weight table (or WDT) includes parameters required for configuring a gain of each band in relation to quantization and dequantization of a precinct. Particularly, a weight table may include a marker (e.g., 0xFF14) for identifying a start of the weight table, information (referred to as G information for clarity) indicating a gain of each band, information (or P information) indicating a priority of each band, etc. Parameters included in the weight table are used to quantize or dequantize a wavelet coefficient of each band together with parameters (e.g., Q information and R information) of a precinct header.

An extension marker may include generic metadata or vendor-specific metadata together with a marker (e.g., 0xFF15) for identifying a start of the extension marker.

A slice may refer to a unit capable of performing coding independently from another part of an image, and includes a wavelet coefficient required for reconstructing a horizontal stripe in an image. A horizontal stripe refers to a region including one or more row in an image. A slice may include one or more precincts. A slice in a bitstream may be represented as a slice header and an integer number of precincts (620).

A slice header may include a marker (e.g., 0xFF20) for identifying a start of a corresponding slice, information (referred to as Lslh information for example) indicating a size (e.g., byte number) of the slice header, and information indicating an index of the corresponding slice in an image. An index of a slice indicates an order of a slice configuring an image, and an index value may be assigned in ascending order from 0 in a manner of proceeding from a top end of an image toward a bottom end of the image.

A precinct refers to a collection of wavelet coefficients of all bands contributing to a specific spatial region of an image, and (entropy-encoded) data for a precinct may be included in one or more packets (see FIG. 3 and relevant description for example). A precinct in a bitstream may be represented as a precinct header and an integer number of packets (630).

A precinct header may include information (referred to as Lprc information for clarity) indicating a size (e.g., byte number) of (entropy-encoded) data included in the precinct 630, information (e.g., Q information and R information) required for obtaining truncation position information (or T information, see FIG. 5 and relevant description) of the precinct 630, and information (referred to as D information for clarity) indicating a coding mode of a bitplane count for each band. Lprc information represents a size of (entropy-encoded) data from an end of a precinct header until a next precinct header or a slice header or an EOC marker as a byte number. D information consists of two bits, an upper one of the two bits indicates whether significance coding is used, and a lower one of the two bits indicates a bitplane count coding mode.

Significance coding refers to forming a significance group by grouping a plurality of (e.g., 8) code groups, generating Z information (or significance flag information, see FIG. 5 and relevant description) for each significance group, and then adding it to a bitstream through a significance subpacket. For example, in case that an upper bit of D information is 1, it indicates that significance coding is used and each packet in a bitstream includes a significance subpacket. If an upper bit of D information is 0, it indicates that significance coding is not used and each packet in a bitstream does not include a significance subpacket.

A bitplane count coding mode means a mode of coding M information (or bitplane count information, see FIG. 5 and relevant description), and may include a raw mode, a no prediction mode, and a vertical prediction mode. In case of a vertical prediction mode, residual information between M information of a current code group and a predicted value is encoded to a bitplane count subpacket using M information of an upper line of a line including the current code group in a current precinct as a predictor (or a predicted value). In case of a vertical prediction mode, residual information may be encoded using a variable length code.

In case of a no prediction mode, residual information of M information of a current code group is found using T information as a predictor instead of M information of an upper line and the residual information is then encoded to a bitplane count subpacket. As a non-limited example, in case that a lower bit of D information is 0, it may indicate a no prediction mode. If a lower bit of D information is 1, it may indicate a vertical prediction mode. In case of a no prediction mode, residual information may be encoded using a variable length code.

In case of a raw mode, M information in an image may be encoded with a fixed bit number, and information (referred to as Br information for clarity) indicating the bit number may be included in a picture header (see FIG. 6 for example). A raw mode may be determined according to override flag information (or Dr information below) signaled through a packet header. For example, if Dr information is 1, a raw mode may be applied. If Dr information is 0, a bitplane count coding mode may be determined according to D information.

A packet includes data resulting from quantizing and entropy-encoding wavelet coefficients included in a single line on one or more bands within a precinct (see the precinct 340 and packets 0~9 in FIG. 3 for example). A packet may be represented as a packet header and a plurality of subpackets in a bitstream, and a subpacket may include at least one of a significance subpacket, a bitplane count subpacket, a data subpacket, and a sign subpacket (640).

A packet header may include override flag information (referred to as Dr information for clarity) additionally indicating a coding mode of bitplane count information, information (referred to as Ldat information for clarity) indicating a size (e.g., byte number) of a data subpacket, information (referred to as Lcnt information for clarity) indicating a size (e.g., byte number) of a bitplane count subpacket, and information (referred to as Lsgn information for clarity) indicating a size (e.g., byte number) of a sign subpacket. Dr information indicates whether a raw mode is applied for M information of a code group included in a packet. Although Lsgn information is included in a packet header irrespective of Fs information described below, the Lsgn information may be ignored depending on a value of the Fs information. Yet, information indicating a size of a significance subpacket is not included in a packet header even if significance coding is used. And, size information of the significance subpacket may be obtained in a manner of being inferred from sizes of a band and line configuring a packet.

As described above, a significance subpacket may be included in a packet if significance coding is used. A significance subpacket may include Z information (or significance flag information) on each significance group of a packet.

A bitplane count subpacket may include M information (or bitplane count information, see FIG. 5 and relevant description) on each code group. As described above, a bitplane count subpacket may include a variable length code indicating residual information for each M information (vertical prediction mode or no prediction mode) or a fixed length code (raw mode) indicating M information according to a bitplane count coding mode.

A data subpacket may include sign information and quantization index magnitude information for a corresponding code group. Quantization index magnitude information is encoded to a data subpacket. Sign information may be encoded to a data subpacket together with quantization index magnitude information or to a sign subpacket separately from quantization index magnitude information. Information (or Fs information) indicating whether sign information is encoded together with a data subpacket or encoded with a sign subpacket separately may be included in a bitstream (e.g., picture header). For example, if a value of Fs information is 0, it indicates that sign information is encoded to a data subpacket, and a sign subpacket is not included in a bitstream. If a value of Fs information is 1, it indicates that sign information is not encoded to a data subpacket but is encoded to a sign subpacket separately, and a sign subpacket is included in a bitstream.

In case that sign information is encoded to a sign subpacket separately, the sign information may be encoded based on quantization index magnitude information of a data subpacket. For example, if quantization index magnitude information has a non-zero value, one sign bit is encoded to a sign subpacket. If quantization index magnitude information has a zero value, a sign bit is not encoded to a sign subpacket.

Hereinafter, for clarity of description, bitplane count information (or M information) may be referred to as a bitplane count or M schematically, and truncation position information (or T information) may be schematically referred to as a truncation position or T.

Figure 7:
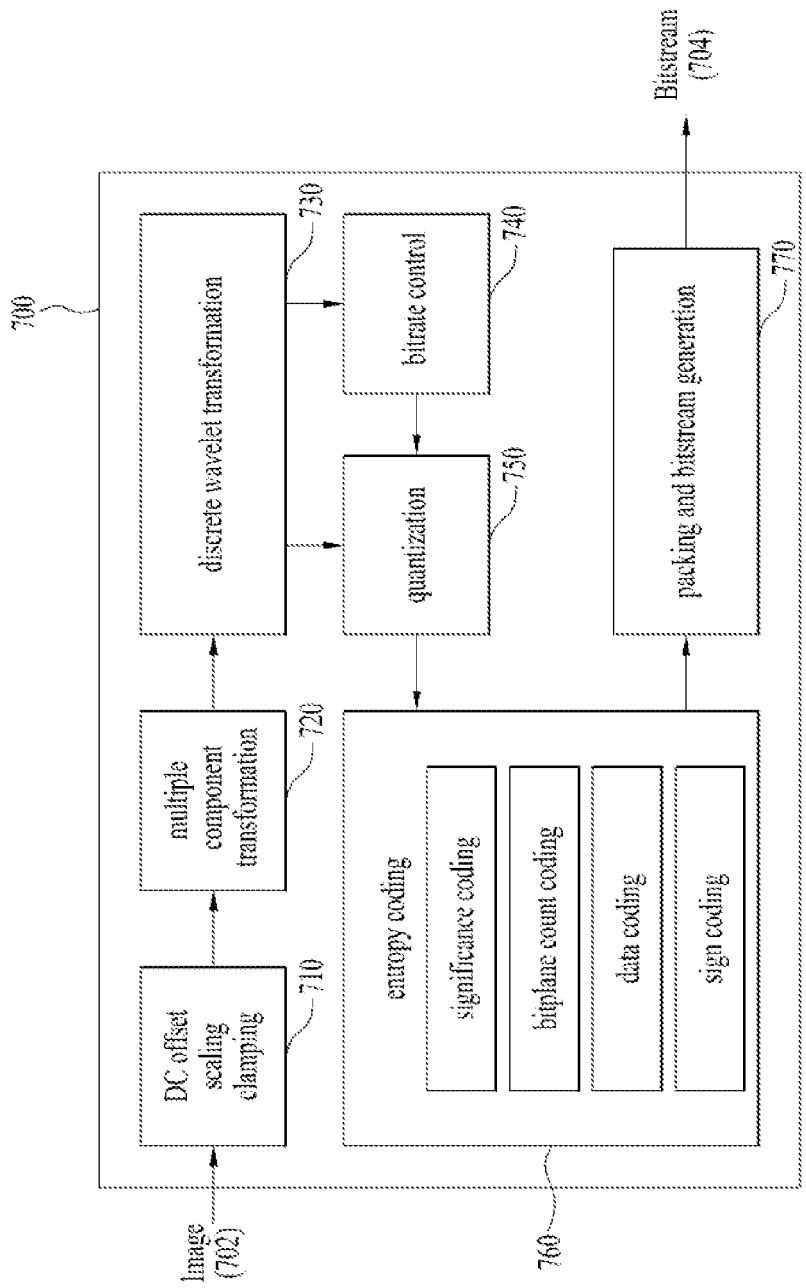
FIG. 7 illustrates a structure of an encoding device to which the present disclosure is applicable.

FIG. 7 illustrates a structure of an encoding device 700 to which the present disclosure is applicable. The encoding device 700 may be used in encoding a video signal. As described above, a video signal refers to a sequence of one or more images (or pictures), and may be stored in a memory (e.g., '12' in FIG. 14). The encoding device 170 may be operatively connected to the memory while operating, receive each image 702 from the memory, and then generate a bitstream 704 (see FIG. 6 and relevant description for example) after encoding the received image 702. The bitstream generated by the encoding device 700 may be temporarily stored in the memory, stored in a computer-readable storage medium (not shown), or transmitted through a wired/wireless transceiver (e.g., '13' in FIG. 14).

The encoding device 700 may include one or more of a DC offset/scaler/clamper 710, a multiple component transformer 720, a discrete wavelet transformer 730, a bit rate controller 740, a quantizer 750, an entropy encoder 760, and a packing and bitstream generator 770.

The DC offset/scaler/clamper 710 may be configured to perform DC offset/scaling/clamping on the image 702 inputted to the encoding device 700. The DC offset refers to an operation of shifting a DC level of image samples, the scaling refers to an operation of scaling a range of the value of the DC level shifted samples, and the clamping refers to an operation of limiting a range of the value of the scaled samples to a range of a valid value.

The multiple component transformer 720 may be configured to perform multiple component transformation according to a color format of the input image 702. The multiple component transformation refers to an operation of transforming a color format. For example, the multiple component transformation may include an operation of transforming an RGB color format into a YCbCr color format. The multiple component transformer 720 may be configured to perform multiple component transformation if a color format of the input image 702 is RGB, or skip the multiple component transformation in a color format of the input image 702 is YCbCr. The encoding device 700 may encode information (or Cpih information) indicating whether to perform the multiple component transformation to a bitstream (e.g., a picture header). For example, if CPih information has a value of 0, it may indicate that the multiple component transformation was not performed. If CPih information has a value of 1, it may indicate that the multiple component transformation was performed. The encoding device 700 may identify a color format of the input image 702 or receive information on the color format of the input image 702 from an external processor (e.g., '11' in FIG. 14).

The discrete wavelet transformer 730 may be configured to decompose an image into a plurality of bands by performing discrete wavelet transformation on image samples and generate wavelet coefficient information. As described with reference to FIG. 2, discrete wavelet transformation refers to a series of process for decomposing an image into at least one high frequency band and at least one low frequency band by applying a highpass filter to samples of an image in horizontal direction and/or vertical direction. For the detailed description of the discrete wavelet transformation, FIG. 2 and relevant description are entirely included as references herein. The wavelet coefficient information generated by the discrete wavelet transformer 730 may be stored in an external memory (e.g., '12' in FIG. 14) or an internal memory (not shown) for the quantization 750 and the bitrate control 740.

The bit rate controller 740 may be configured to determine a quantization parameter by performing a bitrate control based on wavelet coefficient information. The bitrate control refers to an operation of predicting a bit budget required for entropy-encoding (e.g., significance coding, bitplane count coding, data coding, sign coding, etc.) wavelet coefficient information and then determining an optimal quantization parameter based on the predicted bit budget and a target bit budget. The bit budget refers to the number of bits, and may be schematically referred to as a budget.

A quantization parameter may include Q information (or precinct quantization information) and R information (or precinct refinement threshold information) (see FIG. 5 and relevant description for example). The Q information is the information for indicating a quantization extent of a precinct, and the R information is the information indicating a threshold for determining whether to refine an encoding quality by assigning an additional bitplane for each band. The Q information and the R information may indicate a truncation position for each band of a precinct together with G information and R information predefined per band (see Equation 4 below and relevant description for example). As the Q information and the R information are signaled through a precinct header, the bitrate controller 740 may be configured to determine a bit budget for each precinct and determine a quantization parameter for each precinct based on the determined bit budget. The determined quantization parameter may be provided to the quantizer 750. The bitrate controller 740 will be described in detail with reference to FIG. 8.

The quantizer 750 may perform quantization based on the quantization parameter (e.g., Q information and R information) determined by the bitrate controller 740. The quantizer 750 may support two types of quantization. For example, the quantizer 750 may perform deadzone quantization based on a truncation position T (see Equation 2 and relevant description for example). For another example, the quantizer 750 may perform uniform quantization based on a truncation position T and a bitplane count M of a code group (see Equation 3 and relevant description for example). The truncation position T may be determined based on the quantization parameter (e.g., Q information and R information (see Equation 4 and relevant description for example). Since the bitplane count M is determined in code group unit, uniform quantization may be performed on each wavelet coefficient information in code group unit. The quantizer 750 may obtain quantization index information (e.g., quantization index magnitude information and sign information) by performing quantization on each wavelet coefficient information of a code group based on the quantization parameter. The quantization index information may be provided to the entropy encoder 760.

The entropy encoder 760 may perform entropy encoding based on quantization index information (e.g., quantization index magnitude information and sign information). Entropy encoding may include generating a significance subpacket through significance coding, generating a bitplane count subpacket through bitplane count coding, generating a data subpacket based on quantization index magnitude information, and generating a sign subpacket based on sign information.

A significance subpacket is generated if significance coding is enabled. Whether the significance coding is enabled may be determined by the bitrate controller 740, and signaled through D information (e.g., an upper one of two bits) of a precinct header (see FIG. 6 and relevant description for example). If significance coding is enabled, the entropy encoder 760 may group code groups into a significance group, determine whether all code groups of the significance group are zero, and then encode Z information (or significance flag information) to a significance subpacket in significance group unit. For example, a single significance group may include eight code groups.

A bitplane count coding mode may include a raw mode, a non-prediction mode, and a vertical prediction mode (see FIG. 6 and relevant description for example). A bitplane count coding mode may be determined by the bitrate controller 740, and may be signaled through D information (a lower one of two bits) of a precinct header and Dr information of a packet header. In case of applying significance coding, when all code groups of a significance group are 0, a bitplane count M is not encoded to a bitplane count subpacket. Instead, when the significance group includes at least one non-zero code group, the bitplane count M may be encoded to a bitplane count subpacket. Hence, the entropy encoder 760 may encode a bitplane count M to a bitplane count subpacket in code group unit based on a presence or non-presence of significance coding enablement and a bitplane count coding mode.

A data subpacket includes quantization index magnitude information. Sign information may be encoded to a data subpacket together with quantization index magnitude information, or encoded to a signal subpacket separately from quantization index magnitude information. In case that sign information is encoded to a data subpacket, it may be encoded no matter what quantization index magnitude information is 0. On the other hand, if sign information is encoded to a sign subpacket, sign information is encoded when quantization index magnitude information is not zero. Or, when quantization index magnitude information is 0, the sign information is not encoded (see FIG. 6 and relevant description for example). Hence, when sign information is separately encoded to a sign subpacket, as the number of bits for the sign information can be reduced, coding efficiency can be raised.

The packing and bitstream generator 770 may be configured to generate a packet based on entropy-encoded data (e.g., significance subpacket, bitplane count subpacket, data subpacket, sign subpacket, etc.) and generate a bitstream by packing it into a bitstream together with syntax information. For example, the packing and bitstream generator 700 may generate a bitstream according to the bitstream format and syntax information described with reference to FIG. 6.

Figure 8:
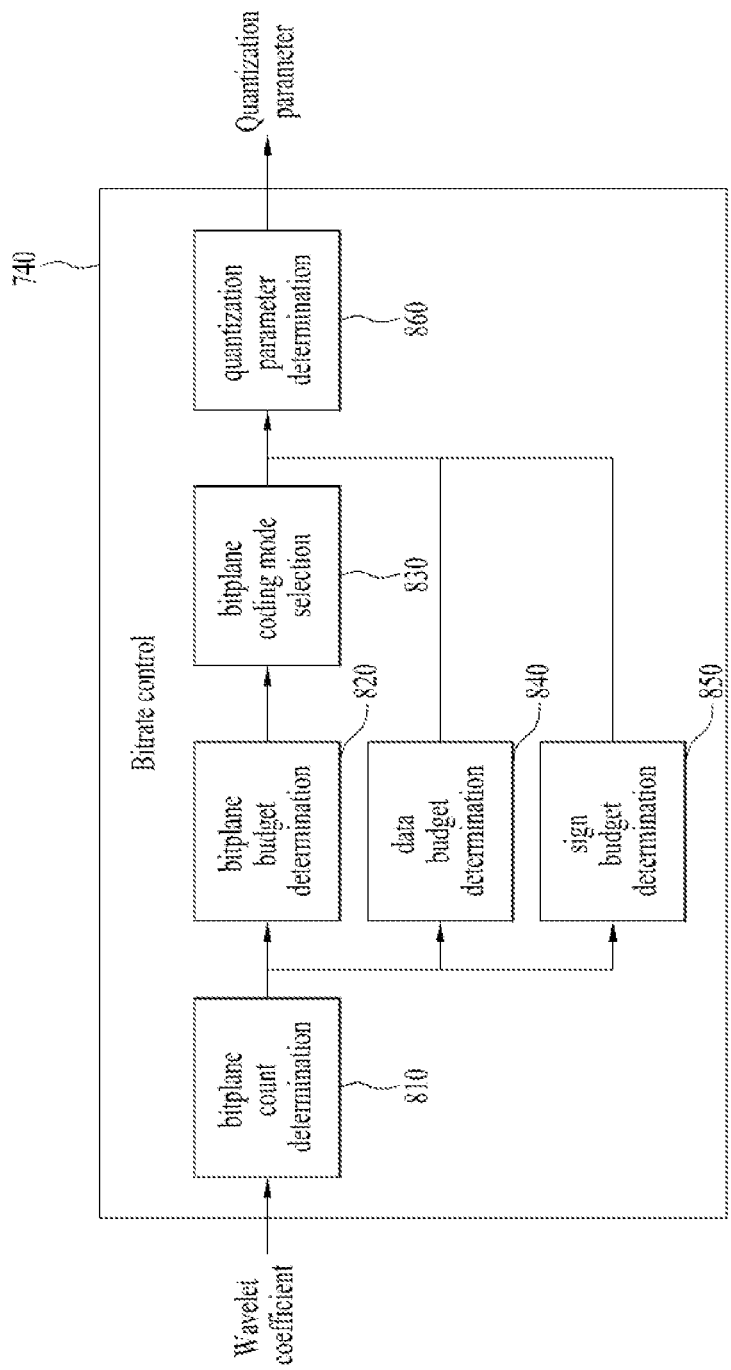
FIG. 8 illustrates a bitrate controller according to the present disclosure.

FIG. 8 illustrates the bitrate controller 740 according to the present disclosure.

The bitrate controller 740 according to the present disclosure may be configured to determine a bit budget for each precinct and determine a quantization parameter for the corresponding precinct based on the determined bit budget. Particularly, the bitrate controller 740 may be configured to receive wavelet coefficient information, determine a bitplane count M by grouping the received wavelet coefficient information into a code group, determine a bit budget based on the code group and the bitplane count M, and determine a quantization parameter based on the determined bit budget and a target bit budget. The wavelet coefficient information may be received from the discrete wavelet transformer 730, the internal memory (not shown) of the encoding device 700, or the external memory (12' in FIG. 14) of the encoding device 700.

The bitrate controller 740 may include at least one of a bitplane count determiner 810, a bitplane budget determiner 820, a bitplane coding mode selector 830, a data budget determiner 840, a sign budget determiner 850, and a quantization parameter determiner 860.

The bitplane counter determiner 810 may be configured to group wavelet coefficient information into a code group and obtain a bitplane count M of the code group. For example, the bitplane count determiner 810 may configure a bitplane based on wavelet coefficient information of a code group, determine a position of a non-zero most significant bitplane, and then determine/obtain a bitplane count M for the code group (see FIG. 5 and relevant description for example). For example, a code group may include four wavelet coefficient informations. The obtained bitplane count M may be provided to the bitplane budget determiner 820, the data budget determiner 840 and the sign budget determiner 850.

The bitplane budget determiner 820 may be configured to determine (or calculate or predict) the number of bits required for encoding a bitplane count M (and/or Z information) of a code group based on each bitplane count counting mode. For clarity of description, the bit number predicted for the bitplane count M (and/or the Z information) is referred to as a bitplane count budget or a biplane budget. In addition, in the present specification, determining a bit budget as 'A' means adding A bits to a bit budget. For one example, determining a bit budget as 0 means adding 0 bit to a bit budget (or not adding any bit to a bit budget). For another example, determining a bit budget as 1 means adding 1 bit to a bit budget.

As described above, a bitplane count coddíng mode includes a raw mode, a no prediction mode and a vertical prediction mode, and may be further subdivided depending on a presence or non-presence of enablement of significance coding. For example, Table 3 illustrates a bitplane count coding mode and an entropy encoding scheme in consideration of a presence or non-presence of enablement of significance coding.

TABLE 3

| Significance coding | Bitplane coding mode | Entropy encoding scheme |
| --- | --- | --- |
| — | Raw mode | Fixed length code |
| Enabled | No prediction mode | 1 bit (for significance group) + Variable length code or NULL |
| Disabled | No prediction mode | Variable length code |
| Enabled | Vertical prediction mode | 1 bit (for significance group) + Variable length code or NULL |
| Disabled | Vertical prediction mode | Variable length code |

Referring to Table 3, in case of a raw mode, significance coding is not used. In addition, in case of the raw mode, a bitplane count M for each code group is entropy-encoded into bits of a fixed length (e.g., 4). Hence, in case of the raw mode, the bitplane budget determiner 820 may determine a bit budget for each code group as 4.

In case that significance coding is enabled, the bitplane budget determiner 820 may determine a bit budget for each significance group as 1. For example, a single significance group may include eight adjacent code groups. In case that significance coding is disabled, the bitplane budget determiner 820 may determine a bit budget for Z information as 0.

If all code groups of a significance group are 0, a bitplane count M is not encoded. Hence, if all code groups of a significance group are 0, the bitplane budget determiner 820 may determine a bit budget for a bitplane count M as 0 ('NULL' in Table 3). Yet, if a significance group includes at least one non-zero code group, a bitplane count M is encoded into a bit of a variable length. Hence, if a significance group includes at least one non-zero code group, the bitplane budget determiner 820 may determine a bit budget for a bitplane count M as the number of variable length codes.

For example, a unary code may be used as a variable length code. A unary code refers to a code including a consecutive bit 1 and a last bit 0. For example, bit 0 indicates a value of 0, a bit 10 indicates a value of 1, a bit 110 indicates a value of 2, a bit 1110 indicates a value of 3, etc. Hence, in case of using such a unary code, a variable length code of (M+1) bits may be generated for each bitplane count M, and a bit budget for the bitplane count M may be determined as (M+1).

In case of a no prediction mode, by taking a truncation position T as a predictor, residual information of a bitplane count M may be encoded into a variable length code. For example, in case that a no prediction mode is used, residual information may be determined as a difference (e.g., (M−T)) between a bitplane count M and a truncation position T, and encoded into a variable length code of (M−T+1) bits. Hence, in case of a no prediction mode, the bitplane budget determiner 820 may determine a bit budget for a bitplane count M as (M−T+1).

In case of a vertical prediction mode, by taking a bitplane count M of a top line of a current code group as a predictor, residual information of a bitplane count M may be encoded into a variable length code. For example, in case of using a vertical prediction mode, residual information may be determined as a difference (e.g., $(M-M_{top})$) between a bitplane count (referred to as $M_{top}$ for clarity) of a top line and a bitplane count M of a current code group, and the residual information may be encoded into a variable length code of $(M-M_{top}+1)$ bits. Hence, in case of a vertical prediction mode, the bitplane budget determiner 820 may determine a bit budget for a bitplane count M as $(M-M_{top}+1)$.

Consequently, the bitplane budget determiner 820 may determine a bit budget for a bitplane count M of each code group for all available truncation positions (e.g., T=0~15) and five kinds of modes (e.g., raw mode, no prediction mode based on significance coding, no prediction mode, vertical prediction mode based on significance coding, and vertical prediction mode), and then provide it to the bitplane coding mode selector 830.

The bitplane count coding mode selector 830 may determine (or select) a bitplane code counting mode based on a bitplane budget. For clarity of description, the bitplane count coding mode selector 830 may be referred to as a bitplane coding mode selector. As described above, a bitplane count coding mode may be indicated based on D information of a precinct header and Dr information of a packet header (see FIG. 6 and relevant description for example). An upper bit of the D information indicates a presence or non-presence of a use of significance coding, a lower bit of the D information indicates a bitplane count coding mode, and the Dr information indicates a presence or non-presence of an override of a raw mode. Hence, one of four modes (e.g., no prediction mode based on significance coding, no prediction mode, vertical prediction mode based on significance coding, vertical prediction mode) may be determined in precinct unit and a presence or non-presence of the raw mode may be determined in packet unit.

Hence, for each truncation position T, the bitplane coding mode selector 830 may be configured to determine a mode having a minimum bit budget in precinct unit among four modes (e.g., no prediction mode based on significance coding, no prediction mode, vertical prediction mode based on significance coding, vertical prediction mode) and enable a raw mode override if a bit budget of a raw mode in packet unit is smaller than that of the rest of the four modes. A bitplane budget and a bitplane count coding mode for each truncation position may be provided to the quantization parameter determiner 860.

The data budget determiner 840 may be configured to determine (or calculate or predict) the number of bits required for encoding quantization index magnitude information of a code group. As described above, in case of encoding sign information to a separate sign packet, sign information is encoded only if quantization index magnitude information is not 0. Hence, encoding sign information to a sign subpacket separately is more efficient in aspect of coding efficiency. For clarity of description, the bit number for quantization index magnitude information is referred to as a data budget.

Quantization index magnitude information (or quantized wavelet coefficient magnitude information) may be encoded to a data subpacket in bit unit in order from a bit position indicated by a bitplane count M to a bit position indicated by a truncation position T by starting with a Most Significant Bit (MSB). Hence, each quantization index magnitude information of a code group may be encoded into (M−T) bits. Hence, the data budget determiner 840 may determine a bit budget for a code group as (M−T)*4. If M is equal to or smaller than T, a bit budget for quantization index magnitude information may be determined as 0. A data budget may be provided to the quantization parameter determiner 860.

The sign budget determiner 850 may be configured to determine (or calculate or predict) the bit number required for entropy encoding sign information of wavelet coefficient information. For clarity of description, the bit number for sign information is referred to as a sign budget. The sign budget determiner 850 will be described in detail below (see FIG. 9, FIG. 10 and relevant description for example).

The quantization parameter determiner 860 may be configured to predict a bit budget based on a bitplane budget, a data budget and a sign budget and determine a quantization parameter based on the predicted bit budget and a target bit budget. A quantization parameter may include Q information and R information (see FIG. 6 and relevant description and description related to '740' in FIG. 7, for example). The Q information and the R information are used to determine a truncation position T used for quantization and may be included in a precinct header of a bitstream. For example, the truncation position T may be obtained based on Equation 4. In Equation 4, R indicates R information, P and G indicate band priority information (or P information) and band gain indicating information (or G information) signaled through a weight table (see FIG. 6 and relevant description for example) of a bitstream, respectively, T indicates a truncation position, and clamp(A, B, C) indicates an operation of clamping A into a value between B and C.

$$T = \text{clamp}(Q - G - r, 0, 15), \text{ where if } (P < R) r = 1, \text{ else } r = 0 \quad \text{[Equation 4]}$$

P information and G information may be determined per band in advance. Table 4 illustrates P information and G information for a 444 format image in case of applying 5-level horizontal decomposition and 2-level vertical decomposition. In Table 4, G[b] and P[b] indicate G information and P information for a band b, respectively.

TABLE 4

| Band b | G[b] | P[b] |
|---|---|---|
| 0 | 4 | 12 |
| 1 | 3 | 15 |
| 2 | 3 | 14 |
| 3 | 3 | 3 |
| 4 | 2 | 11 |
| 5 | 2 | 10 |
| 6 | 3 | 24 |
| 7 | 2 | 26 |
| 8 | 2 | 27 |
| 9 | 2 | 0 |
| 10 | 1 | 4 |
| 11 | 1 | 5 |
| 12 | 2 | 18 |
| 13 | 1 | 21 |
| 14 | 1 | 20 |
| 15 | 2 | 19 |
| 16 | 1 | 23 |
| 17 | 1 | 22 |
| 18 | 1 | 13 |
| 19 | 0 | 16 |
| 20 | 0 | 17 |
| 21 | 1 | 2 |
| 22 | 0 | 9 |
| 23 | 0 | 6 |
| 24 | 1 | 1 |
| 25 | 0 | 7 |
| 26 | 0 | 8 |
| 27 | 1 | 25 |
| 28 | 0 | 28 |
| 29 | 0 | 29 |

The quantization parameter determiner 860 may save a bit budget for all available truncation positions (e.g., T=0~!15) per band based on a bitplane budget, a data budget and a sign budget and determine Q information and R information that meet a target bit budget based on Equation 4 for example. For instance, the quantization parameter determiner 860 may determine a maximum Q value that meets a condition that a bit budget for a precinct is equal to or smaller than a target bit budget in a manner of increasing Q from 0 while 'R=0' is fixed. Subsequently, the quantization parameter determiner 860 may determine a maximum R value that meets a condition that a bit budget for a precinct is equal to or smaller than a target bit budget in a manner of increasing R from 0 while fixing Q to the determined maximum value.

As Q information and R information are signaled through a precinct header (see FIG. 6 and relevant description for example), the quantization parameter determiner 860 may determine the Q information and the R information in precinct unit. The determined Q and R informations may be provided to the quantizer 750 and the entropy encoder 760. The quantizer 750 may obtain a truncation position T from the Q information and the R information based on Equation 4 and perform quantization based on the obtained position. Alternatively, the Q information and the R information may be transformed into a truncation position T based on Equation 4 and then provided to the quantizer 750.

For example, a target bit budget may be determined in precinct unit. The target bit budget may be determined in a manner of dividing a target bit rate by the number of precincts. A bit rate refers to the number of bits per second. For example, assuming that a video signal has a target bit rate of 3209 Mbits/second and a frame rate of 120 Hz, as 120 images are encoded per second, a target bit budget in image unit may be determined as 3209/120 Mbits. In addition, in this example, assuming that an image has resolution of 3840×2160, that a width of a precinct is configured equal to that of the image, and that 2-level vertical decomposition is applied, a single image can be divided into 540 (=2160/4) precincts, whereby a target bit budget in precinct unit may be determined as 3209/120/540*1000 Kbits.

Figure 9:
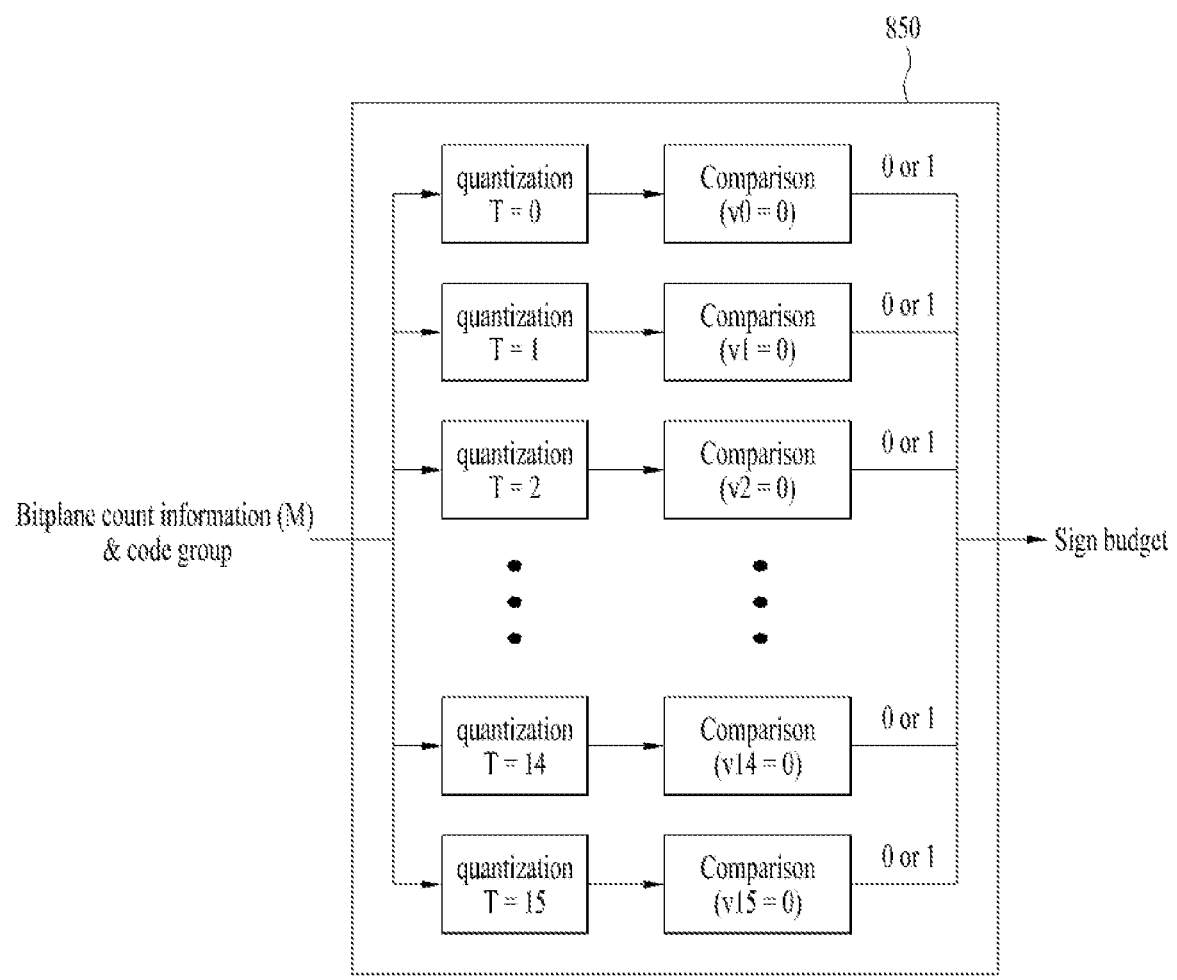
FIG. 9 illustrates a technical problem possibly caused in code budget determination.

FIG. 9 illustrates a technical problem possibly caused in code budget determination.

In case that sign information is separately encoded to a sign subpacket, if corresponding quantization index magnitude information is not 0, one bit is encoded as sign information. If corresponding quantization index magnitude information is 0, sign information is not encoded. Hence, in case that sign information is encoded to a sign subpacket, the sign budget determiner 850 may generate quantization index magnitude information by performing quantization based on a bitplane count M of a code group and then determine a sign budget based on whether a value of the quantization index magnitude information is 0.

In addition, for the efficient determination of a quantization parameter (e.g., Q information and R information), the sign budget determiner 850 determines a sign budget for all available truncation positions T and then provides it to the quantization parameter determiner 860. As T may have a value of 0 to 15 for example, the sign budget determiner 850 performs quantization sixteen times based on the truncation positions T of 0 to 15, thereby determining a sign budget for each truncation position T. Although deadzone quantization can be implemented with a relatively simple computation, since lots of computation amount is necessary (see Equation 3 for example), determining a sign budget by performing quantization sixteen times may be the cause of lowering overall performance.

To improve such a technical problem, it is able to consider a method of performing quantization sixteen times. Referring to FIG. 9, 16 the sign budget determiner 850 may be configured to perform quantization 16 times in parallel by configuring 16 quantizers for truncation positions T of 0 to 15. An output of each quantizer is inputted to a comparator, and each comparator may be configured to determine a bit budget as 1 if a quantization result value (v0 to v15) is not 0 or as 0 if the quantization result value 9s 0. However, when uniform quantization is implemented with hardware, it has high complexity and thus occupies a lot of area (e.g., about 10,000 gates per uniform quantizer) relatively, it may cause a problem that a hardware area occupied by the bitrate controller 740 increases considerably.

Particularly, in case of encoding an image having high resolution of 4K or 8K, performance capable of determining a sign budget for a plurality of wavelet coefficient information per clock is required. For example, assuming a case of encoding a 60-Hz video signal having 8192×4320 resolution in 444 format, 6,370,000 (=8192*4320*3*60) wavelet coefficient informations should be processed per second. In this example, assuming that the sign budget determiner 850 processes one wavelet coefficient information per clock by a pipeline scheme based on 480-MHz clock, as 4,80,000 wavelet coefficient informations can be processed per second, the encoding device 700 may be implemented to include 16 sign budget determiners shown in FIG. 9. In this case, as 16*16 quantizers are necessary, it may cause a problem that a hardware area occupied by the bitrate controller 740 increases explosively.

Proposed in the present disclosure are a method and apparatus for lowering a computation amount required for sign budget determination and greatly reducing an occupied area in case of hardware implementation. Although the present disclosure is described centering on uniform quantization, the principle of the present disclosure is identically/similarly applicable to other quantization schemes.

Referring now to Equation 3, v indicates a quantization index magnitude, M indicates a bitplane count of a code group, d indicates wavelet coefficient magnitude information, and T indicates a truncation position. When uniform quantization based on Equation 3 is performed on each wavelet coefficient information belonging to a code group, if a quantization index magnitude v is equal to greater than 1, a bit budget for the corresponding wavelet coefficient information is determined as 1. If a quantization index magnitude v is 0, a bit budget for the corresponding wavelet coefficient information is determined as 0.

Uniform quantization of equation 3 may be represented as Equation 5.

$$v = \frac{d \cdot 2^{M-T+1} - d + 2^M}{2^{M+1}} \quad \text{[Equation 5]}$$

If v is equal to greater than 1 in Equation 5, it may be represented as Equation 6.

$$v = \frac{d \cdot 2^{M-T+1} - d + 2^M}{2^{M+1}} \geq 1 \quad \text{[Equation 6]}$$

If Equation 6 is organized, it may be represented as Equation 7.

$$d \cdot 2^{M-T+1} - d + 2^M \geq 2^{M+1} d \geq \frac{2^M}{2^{M-T+1} - 1} \quad \text{[Equation 7]}$$

A right side of Equation 7 may be approximated into Equation 8.

$$\frac{2^M}{2^{M-T+1} - 1} \cong \frac{2^M}{2^{M-T+1}} = 2^{T-1} \quad \text{[Equation 8]}$$

As an approximation result of Equation 8 becomes smaller than a right side of Equation 7, if Equation 8 is applied to Equation 7, it may be represented as Equation 9.

$$d > 2^{T-1} \quad \text{[Equation 9]}$$

Meanwhile, the number of significant bits of each wavelet coefficient information of a code group is represented as Mx. The significant bit number refers to the bit number from a least significant bit to a most significant bit in an absolute value of wavelet coefficient information (or wavelet coefficient magnitude information). Assuming that there are 4 wavelet coefficient informations for each code group for example, the significant bit number of each wavelet coefficient information may be represented as M0, M1, M2, or M3. For example, referring to the example of FIG. 5 again, a code group may include 4 wavelet coefficient informations −32, 274, 9 and 6, and a bitplane count M of the code group may be determined as 9. In this example, since a first wavelet coefficient information is −32, the significant bit number (or M0) is 6. Since a second wavelet coefficient information is 274, the significant bit number (or MD is 9. Since a third wavelet coefficient information is 0, the significant bit number (or M2) is 0. Since a fourth wavelet coefficient information is 6, the significant bit number (or M3) is 3.

If the significant bit number of wavelet coefficient information is Mx, a minimum value of wavelet coefficient magnitude information d may be represented by Equation 10.

$$d = 2^{Mx-1} \quad \text{[Equation 10]}$$

If Equation 10 is applied to Equation 9, it may be represented as Equation 11. Equation 12 is then obtained from Equation 11.

$$2^{Mx-1} \quad \text{[Equation 11]}$$

$$Mx > T \quad \text{[Equation 12]}$$

As observed from Equations 5 to 12, if the significant bit number Mx of each wavelet coefficient information is greater than a truncation position T, quantization index magnitude information v has a value equal to or greater than 1. Hence, if the significant bit number Mx of wavelet coefficient information is greater than a truncation position T, a bit budget for sign information of the wavelet coefficient information may be determined as 1. If the significant bit number Mx of wavelet coefficient information is greater than a truncation position T, it is unnecessary to perform (uniform) quantization to find quantization index magnitude information v and the (uniform) quantization may be skipped.

On the other hand, as uniform quantization is performed based on a bitplane count M of a code group and a truncation position T, if the significant bit number Mx of wavelet coefficient information is equal to a truncation position T, it is difficult to predict a quantization index magnitude v. Hence, if the significant bit number Mx of wavelet coefficient information is equal to a truncation position T (i.e., Mx=T), quantization is performed on wavelet coefficient information and a bit budget for sign information may be then determined according to the quantization result (or quantization index magnitude information V). Particularly, if the quantization result is 0, a bit budget for wavelet coefficient information may be determined as 0. If the quantization result is not 0, a bit budget for wavelet coefficient information may be determined as 1.

Meanwhile, uniform quantization based on Equation 3 may be understood as uniformly classifying an interval between a bitplane count M and a truncation position T by taking a quantization step size as $$\Delta = \frac{2^{M+1}}{2^{M+1-T} - 1}.$$

Hence, if the significant bit number Mx of wavelet coefficient information is smaller than a truncation position T (i.e., Mx<T), the quantization result (or quantization index magnitude information v) becomes 0. Hence, if the significant bit number Mx of wavelet coefficient information is smaller than a truncation position T (i.e., Mx<T), a bit budget for sign information of wavelet coefficient information may be determined as 0. In this case (i.e., Mx<T), it is unnecessary to perform (uniform) quantization to find quantization index magnitude information v and the (uniform) quantization may be skipped.

Figure 10:
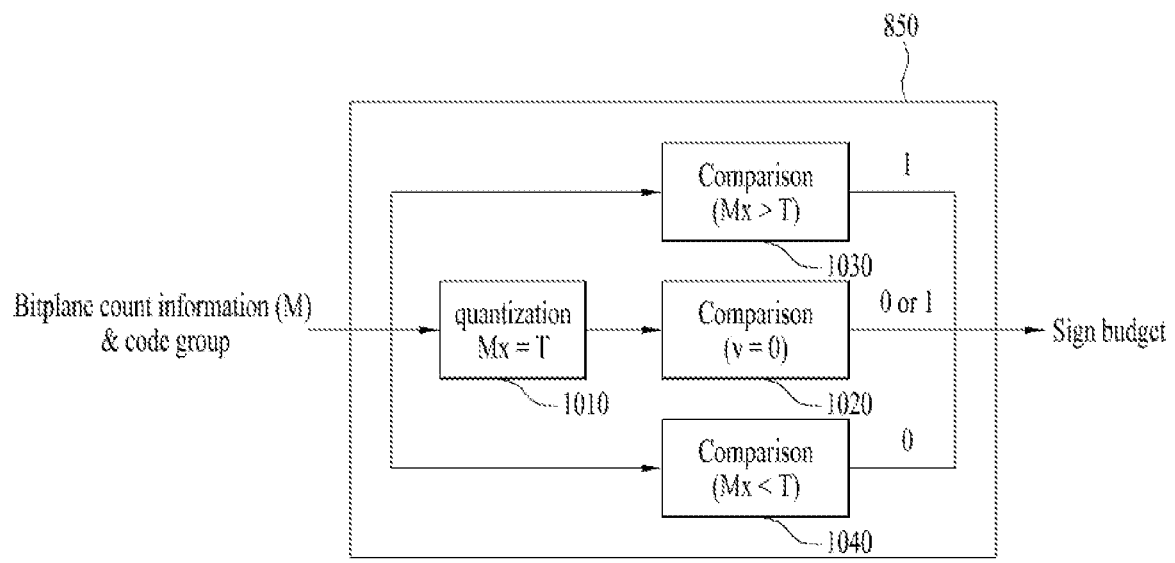
FIG. 10 illustrates a code budget determiner according to the present disclosure.

FIG. 10 illustrates the code budget determiner 850 according to the present disclosure.

As illustrated in FIG. 10, the sign budget determiner 850 according to the present disclosure may include a single quantizer 1010 and three comparators 1020, 1030 and 1040 for all available truncation positions (e.g., T=0~15). Hence, according to the present disclosure, compared to the example of FIG. 9, 15 quantizers can be removed, thus providing technological advances in terms of hardware. Specifically, if 16 wavelet coefficient informations are processed per clock for high resolution image encoding of 4K or 8K, the related art requires 16×16 quantizers, whereas the present disclosure can remove 15×16 quantizers, thus providing technological advances more innovative than the related art.

Furthermore, even if using a general-purpose processor to determine a sign budget, uniform quantization is performed only if the significant bit number Mx of wavelet coefficient information is equal to a truncation position T. Otherwise (i.e., Mx>T or Mx<T), quantization is not performed (or skipped). Thus, the present disclosure can provide significant technological advances in image encoding techniques themselves. Therefore, the present disclosure can provide breakthrough technological advances not only in terms of hardware but also in terms of image encoding technology.

Referring to FIG. 10, the sign budget determiner 850 may determine whether the significant bit number Mx of wavelet coefficient information is equal to a truncation position T. If the significant bit number Mx of wavelet coefficient information is equal to the truncation position T, the sign budget determiner 850 may perform uniform quantization through a quantizer 1010. A comparator 1020 determines whether a quantization result is 0. If the quantization result is 0, the comparator 1020 may determine a sign budget as 0. If the quantization result is not 0, the comparator 1020 may determine a sign budget as 1.

If the significant bit number of wavelet coefficient information is greater than a truncation position (i.e., Mx>T), the comparator 1030 may be configured to set a sign budget to 1. In this case (i.e., Mx>T), since it is unnecessary for the sign budget determiner 850 to perform quantization, the sign budget determiner 850 does not include a separate quantizer, whereby quantization is skipped. If the significant bit number of wavelet coefficient information is smaller than a truncation position (i.e., Mx<T), the comparator 1030 may be configured to set a sign budget to 0. In this case (i.e., Mx>T), since it is unnecessary for the sign budget determiner 850 to perform quantization on wavelet coefficient information, the sign budget determiner 850 does not include a separate quantizer, whereby quantization is skipped.

The sign budget determiner 850 may perform the above-described operation on all available truncation positions (e.g., T=0~15), thereby determining a sign budget for each wavelet coefficient information of a code group. The sign budget may be provided to the quantization parameter determiner 860.

The sign budget determiner 850 according to the present disclosure may be included in the bitrate controller 740 or the encoding device 700.

Figure 11:
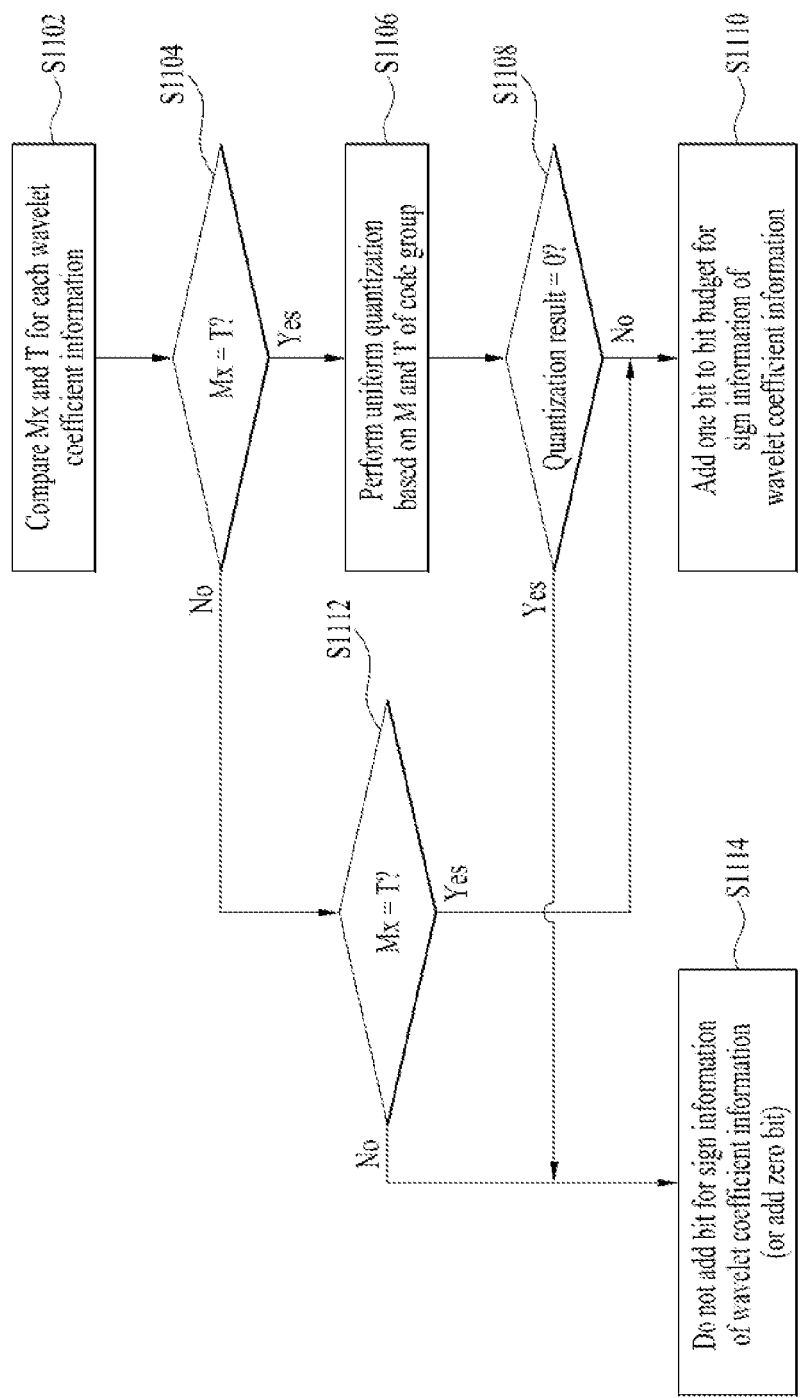
FIG. 11 is a flowchart of a code budget determining method according to the present disclosure.

FIG. 11 is a flowchart of a code budget determining method according to the present disclosure. The method of FIG. 11 may be performed by the encoding device 700, and more particularly, by the bitrate controller 740 or the bit budget determiner 850. In FIG. 11, quantization may include uniform quantization, and the uniform quantization may be performed based on a bitplane count M and a truncation position T of a code group (see Equation 3 and relevant description for example).

In a step S1102, the encoding device 700 may compare a significant bit number Mx of each wavelet coefficient information and a truncation position T of a code group with each other.

If the significant bit number Mx of the wavelet coefficient information and the truncation position T are equal to each other [S1104], the encoding device 700 performs quantization on the wavelet coefficient information [S1106]. If a quantization result (e.g., quantization index magnitude information) is 0 [S1108], the encoding device 700 may determine a bit budget for sign information of the wavelet coefficient information as 0 [S1114]. If a quantization result is not 0 [S1108], the encoding device 700 may determine a bit budget for sign information of the wavelet coefficient information as 1 [S1110].

If the significant bit number Mx of the wavelet coefficient information and the truncation position T are not equal to each other [S1104], the encoding device 700 may determine whether the significant bit number Mx of the wavelet coefficient information is greater than the truncation position T [S1112]. If the significant bit number Mx of the wavelet coefficient information is greater than the truncation position T [S1112], the encoding device 700 may determine a bit budget for sign information of the wavelet coefficient information as 1 [S1110]. If the significant bit number Mx of the wavelet coefficient information is smaller than the truncation position T [S1112], the encoding device 700 may determine a bit budget for sign information of the wavelet coefficient information as 0 [S1114].

The method illustrated in FIG. 11 may be repeatedly performed on all available truncation positions (e.g., T=0~15). In addition, the method of FIG. 11 may be repeatedly performed on each wavelet coefficient information included in a code group.

Figure 12:
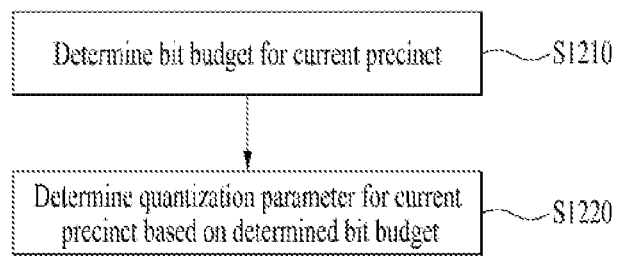
FIG. 12 is a flowchart of a bitrate control method according to the present disclosure.

FIG. 12 is a flowchart of a bitrate control method according to the present disclosure. The method of FIG. 12 may be performed by the encoding device 700 (or the bitrate controller 740). As the method of FIG. 12 may correspond to an operation of the bitrate controller 740, the entire descriptions with reference to FIG. 8, FIG. 10 and FIG. 11 are included as references herein.

In a step S1210, the encoding device 700 may determine a bit budget for a current precinct. Particularly, the encoding device 700 may group wavelet coefficient informations into a code group and then obtain a bitplane count M of the code group. In addition, the encoding device 700 may determine a bit budget for the bitplane count M of the code group for each available bitplane count coding mode (see Table 3 for example) and then determine a bitplane count coding mode (for each truncation opposition) based on the determined bit budget. In addition, the encoding device 700 may determine a bit budget for quantization index magnitude information of the code group.

Moreover, in the step S1210, the encoding device 700 may determine a bit budget for sign information of the wavelet coefficient information. Particularly, based on a result that the significant bit number of the wavelet coefficient information is greater than a truncation position, the encoding device 700 determines the bit budget for the sign information of the wavelet coefficient information as 1. Or, based on a result that the significant bit number of the wavelet coefficient information is smaller than a truncation position, the encoding device 700 determines the bit budget for the sign information of the wavelet coefficient information as 0. In addition, based on a result that the significant bit number of the wavelet coefficient information is equal to a truncation position, the encoding device 700 performs quantization on the wavelet coefficient information. If the quantization result is 0, the encoding device determines the bit budget for the sign information of the wavelet coefficient information as 0. If the quantization result is not 0, the encoding device determines the bit budget for the sign information of the wavelet coefficient information as 1.

Furthermore, in the step S1210, based on a result that the significant bit number of the wavelet coefficient information is greater than a truncation position, the encoding device 700 skips quantization. Based on a result that the significant bit number of the wavelet coefficient information is smaller than a truncation position, the encoding device 700 skips quantization. In this case, the quantization may include uniform quantization that may be performed based on a truncation position and a bitplane count of a code group (see Equation 3 and relevant description for example).

The encoding device 700 performs the step S1210 on all available truncation positions (e.g., T=0~15), thereby determining a bit budget for a current precinct.

In a step s1220, the encoding device 700 may determine a quantization parameter for a current precinct based on the determined bit budget. Particularly, the encoding device 700 may save the bit budget for all available truncation positions (e.g., T=0~15) per band and then determine an optimal quantization parameter that meets a target bit budget based on it. A quantization parameter may include Q information and R information, and the relationship between the Q information and the R information may be determined based on Equation 4 for example.

For example, in the step S1220, the encoding device 700 may determine a maximum Q value that meets a condition that a bit budget for a current precinct is equal to or smaller than a target bit budget while increasing Q information from 0 by fixing R information to 0 in advance. Subsequently, the encoding device 700 may determine a maximum R value that meets a condition that a bit budget for a current precinct is equal to or smaller than a target bit budget while increasing R information from 0 by fixing Q information to the determined maximum value. As observed from Equation 4, a gain per band may be adjusted based on G information in the course of increasing Q information, and an improved amount may be adjusted finely based on R information in the course of increasing the R information. Since a bit budget for all available truncation positions (e.g., T=0~15) is stored per band and relationship among Q information, R information and truncation position can be determined based on Equation 4, the encoding device 700 may determine optimal Q information and R information that meet a target bit budget by adjusting Q information and R information.

As described with reference to FIG. 8, since a quantization parameter (e.g., Q information and R information) may be signaled through a precinct header, the method shown in FIG. 12 may be preferably performed in precinct unit.

Figure 13:
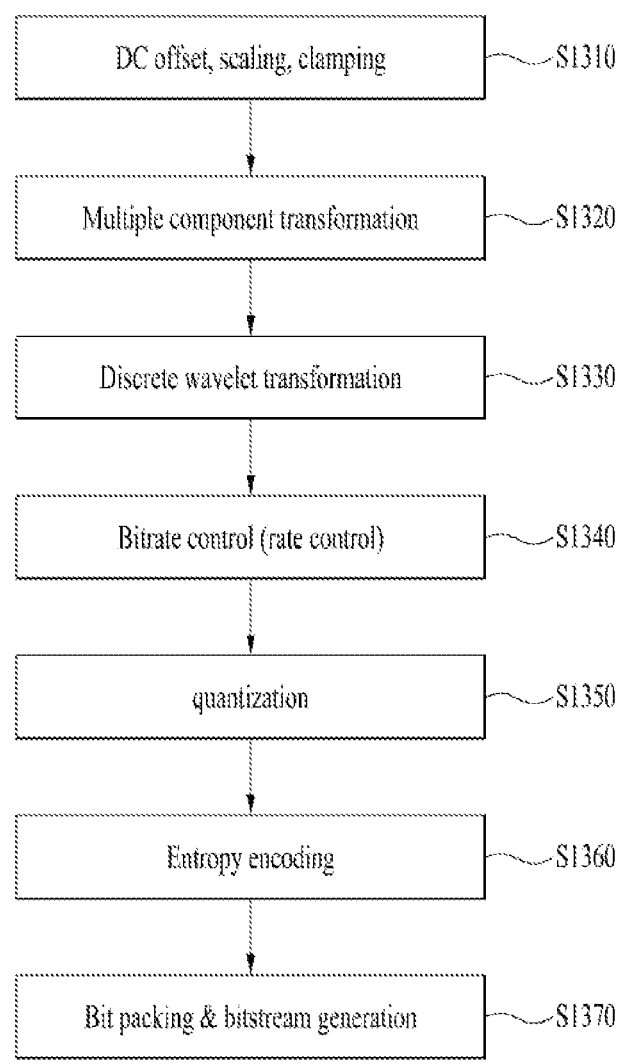
FIG. 13 is a flowchart of a video encoding method according to the present disclosure.

FIG. 13 is a flowchart of a video encoding method according to the present disclosure. The method shown in FIG. 13 may be performed by the encoding device 700, and may be repeatedly performed on each image configuring a video signal. In addition, a bitstream generated by the method of FIG. 13 may have the format described with reference to FIG. 6. And, the bitstream may be temporarily stored in an internal or external memory (e.g., '12' in FIG. 14) of the encoding device, stored in a computer-readable storage medium, or transmitted through a wired/wireless transceiver (e.g., '13' in FIG. 14).

A step S1310 of FIG. 13 may correspond to the operation of the DC offset/scaler/clamper 710 of FIG. 7, a step S1320 of FIG. 13 may correspond to the operation of the multiple component transformer 720 of FIG. 7, a step S1330 of FIG. 13 may correspond to the operation of the discrete wavelet transformer 730, a step S1350 of FIG. 13 may correspond to the operation of the quantizer 750 of FIG. 7, a step S1360 of FIG. 13 may correspond to the operation of the entropy encoder 760 of FIG. 7, and a step S1370 of FIG. 13 may correspond to the operation of the packing and bitstream generator 770. Therefore, the entire description of FIG. 7 is included as a reference herein.

In a step S1340, the encoding device 700 may perform the methods (i.e., the operations according to FIG. 8 and FIG. 10 referred to in those drawings) described with reference to FIG. 11 and FIG. 12. Therefore, the entire description of FIG. 8, FIG. 10, FIG. 11 and FIG. 12 is included as a reference herein.

Figure 14:
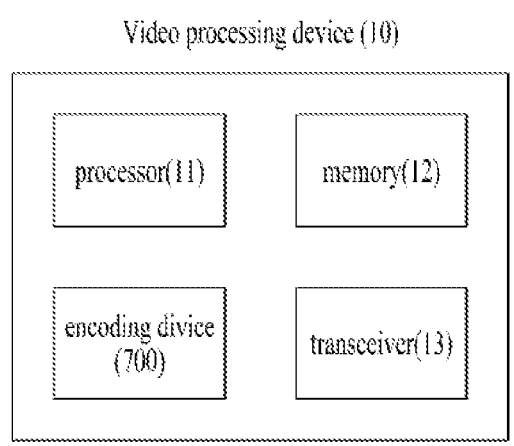
FIG. 14 is a block diagram of a video processing device to which the present disclosure is applicable.

FIG. 14 is a block diagram of a video processing device to which the present disclosure is applicable. An image processing device 10 may include an encoding device 700 configured to encode video signals. For example, the image processing device 10 to which the present disclosure is applicable may include a mobile terminal such as a smartphone, a portable device such as a laptop computer, a home appliance such as a digital TV or a digital video player. For another example, the image processing device to which the present disclosure is applicable may be included as a part of Application Specific Integrated Circuit (ASIC) implemented as system On Chip (SOC).

A memory 12 may store programs for the processing and control of a processor 11 and also store an encoded bitstream 704, a decoded image, control information (e.g., syntax information generated from encoding, see FIG. 6), temporary data (e.g., wavelet coefficient information, bit budget, etc.) generated from an encoding process, etc. In addition, the memory 12 may be utilized as a buffer for various image signals. The memory 12 may be implemented with such a storage device as ROM (Read Only Memory), RAM (Random Access Memory), EPROM (Erasable Programmable Read Only Memory), EEPROM (Electrically Erasable Programmable Read-Only Memory), flash memory, SRAM (Static RAM), HDD (Hard Disk Drive), SSD (Solid State Drive), etc.

The processor 11 controls operations of the respective modules in the image processing device. Particularly, the processor 11 may perform various control functions for performing the encoding according to the present disclosure. The processor 11 may be named one of a controller, a microcontroller, a microprocessor, a microcomputer and the like.

The encoding device 700 may have the structure described with reference to FIG. 7, FIG. 8 and FIG. 10, and may be configured to perform the methods described with reference to FIGS. 11 to 13. The encoding device 700 may be implemented by hardware, firmware, software, or combinations thereof. In case of implementing the present disclosure using hardware, the encoding device 700 may be provided with such devices configured to perform the present disclosure as ASIC (application specific integrated circuit), DSP (digital signal processor), DSPD (digital signal processing device), PLD (programmable logic device), FPGA (field programmable gate array) and the like. Meanwhile, in case of implementing the present disclosure using firmware or software, the firmware or software may be configured to include modules, procedures, functions and the like to perform functions or operations of the present disclosure. And, the firmware or software configured to perform the present disclosure may be driven in a manner of being installed on the encoding device 700 or stored in the memory 12.

In addition, the device 10 may optionally include a wired or wireless transceiver 13. The transceiver 13 is operatively connected to the processor 11, and the processor 11 may control the transceiver 13 to transmit or receive wireless/wired signals that carry information and/or data, signals, messages and the like through a network. The transceiver 13 supports various communication specifications such as IEEE 802 series, 3GPP LTE(-A), Wi-Fi, ATSC (Advanced Television System Committee), DVB (Digital Video Broadcasting), etc., and may transmit/receive control information and/or image signals such as an encoded bitstream according to the corresponding communication specification. The transceiver 13 may not be included in the device if necessary.

In addition, the device 10 may optionally include an input/output interface (not shown). The input/output interface is operatively connected to the processor 11 during an operation, and the processor 11 may control the input/output interface to receive or output control signals and/or data signals. To be connected to such an input device as a keyboard, a mouse, a touchpad, a camera and the like or an output device such as a display and the like, the input/output interface may support such specifications as USB (Universal Serial Bus), Bluetooth, NFC (Near Field Communication), serial/parallel interface, DVI (Digital Visual Interface), HDMI (High Definition Multimedia Interface), etc.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure may be achieved by various means, for example, hardware, firmware, software, or a combination thereof. In a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present disclosure without departing from the spirit or scope of the disclosure. Therefore, the above-mentioned detailed description must be considered only for illustrative purposes instead of restrictive purposes. The scope of the present disclosure must be decided by a rational analysis of the claims, and all modifications within equivalent ranges of the present disclosure are within the scope of the present disclosure.

INDUSTRIAL APPLICABILITY

The present disclosure is applicable to an image processing device including an encoding device.

What is claimed is:
1. A method of encoding a video signal in an encoding device, the method comprising:
determining a bit budget for a current precinct; and determining a quantization parameter for the current precinct based on the determined bit budget, wherein the current precinct includes wavelet coefficient information, wherein the wavelet coefficient information is grouped into a code group, wherein the determining the bit budget for the current precinct comprises determining a bit budget for sign information of the wavelet coefficient information based on that the number of significant bits of the wavelet coefficient information is greater than a truncation position, determining the bit budget for the sign information of the wavelet coefficient information as 0 based on that the significant bit number of the wavelet coefficient information is smaller than the truncation position, performing quantization on the wavelet coefficient information based on that the significant bit number of the wavelet coefficient information is equal to the truncation position, determining the bit budget for the sign information of the wavelet coefficient information as 0 based on that a result of the quantization is 0, and determining the bit budget for the sign information of the wavelet coefficient information as 1 based on that a result of the quantization is not 0, wherein the quantization is skipped based on that the significant bit number of the wavelet coefficient information is greater than the truncation position.

2. The method of claim 1, wherein the quantization is skipped based on that the significant bit number of the wavelet coefficient information is smaller than the truncation position.

3. The method of claim 1, wherein the quantization includes uniform quantization based on the truncation position and a bitplane count of the code group.

4. The method of claim 3, wherein the uniform quantization is performed based on a following equation:

$$v=((d<<\zeta)-d+(1<<M))>>(M+1), \zeta M-T+1,$$

wherein the v indicates the result of the quantization, wherein the d indicates an absolute value of the wavelet coefficient information, wherein the M indicates the bitplane count of the code group, and wherein the T indicates the truncation position.

5. The method of claim 3, wherein the bitplane count indicates the number of bitplanes ranging from a least significant bitplane to a non-zero most significant bitplane among bitplanes of the code group and wherein the bitplane indicates arrangement of bits located at the same significance in the wavelet coefficient information of the code group.

6. The method of claim 1, wherein the truncation position indicates the number of least significant bitplanes to be received from each wavelet coefficient information of the code group by the quantization.

7. The method of claim 1, wherein the code group includes four consecutive wavelet coefficient informations in the current precinct.

8. The method of claim 1, wherein the significant bit number of the wavelet coefficient information indicates the bit number ranging from a least significant bit to a non-zero most significant bit in an absolute value of the wavelet coefficient information.

9. The method of claim 1, further comprising obtaining quantization index information by performing the quantization on the wavelet coefficient information based on the determined quantization parameter.

10. The method of claim 9, further comprising performing entropy encoding based on the quantization index information, wherein the performing the entropy encoding comprises encoding one bit indicating sign information of the wavelet coefficient information to a sign subpacket based on that the quantization index magnitude information is not 0 and skipping encoding for the sign information of the wavelet coefficient information based on that the quantization index magnitude information is 0.

11. The method of claim 10, further comprising generating a bitstream for the video signal based on the sign subpacket.

12. An apparatus for encoding a video signal, the apparatus comprising:

a memory storing wavelet coefficient information configuring a current precinct; and a bitrate controller configured to determine a bit budget for the current precinct and determine a quantization parameter for the current precinct based on the determined bit budget, wherein the wavelet coefficient information is grouped into a code group and wherein the bitrate controller is further configured to determine a bit budget for sign information of the wavelet coefficient information based on that the number of significant bits of the wavelet coefficient information is greater than a truncation position, determine the bit budget for the sign information of the wavelet coefficient information as 0 based on that the significant bit number of the wavelet coefficient information is smaller than the truncation position, perform quantization on the wavelet coefficient information based on that the significant bit number of the wavelet coefficient information is equal to the truncation position, determine the bit budget for the sign information of the wavelet coefficient information as 0 based on that a result of the quantization is 0, and determine the bit budget for the sign information of the wavelet coefficient information as 1 based on that a result of the quantization is not 0, wherein the quantization is skipped based on that the significant bit number of the wavelet coefficient information is greater than the truncation position.

* * * * *